US008571916B1

(12) United States Patent
Bruce et al.

(10) Patent No.: US 8,571,916 B1
(45) Date of Patent: Oct. 29, 2013

(54) METHODS, SYSTEMS, AND ARTICLES OF MANUFACTURE FOR DETERMINING OPTIMAL PARAMETER SETTINGS FOR BUSINESS INITIATIVE TESTING MODELS

(75) Inventors: Anthony Dean Bruce, Chevy Chase, MD (US); Corey Christian Vaudo, Vienna, VA (US); Dacheng Zhao, San Francisco, CA (US); Mark James D'Agostino, Washington, DC (US)

(73) Assignee: Applied Predictive Technologies, Inc., Arlington, VA (US)

( * ) Notice: Subject to any disclaimer, the term of this patent is extended or adjusted under 35 U.S.C. 154(b) by 1198 days.

(21) Appl. No.: 11/364,197

(22) Filed: Mar. 1, 2006

Related U.S. Application Data

(63) Continuation-in-part of application No. 10/767,191, filed on Jan. 30, 2004, now Pat. No. 8,010,399.

(51) Int. Cl.
*G06Q 10/00* (2012.01)
*G06Q 40/00* (2012.01)

(52) U.S. Cl.
USPC .................. 705/7.28; 705/7.11; 705/7.38

(58) Field of Classification Search
USPC ............... 705/7.11, 7.28–7.38; 717/124, 126, 717/127, 131
See application file for complete search history.

(56) References Cited

U.S. PATENT DOCUMENTS

| | | | |
|---|---|---|---|
| 4,972,504 A | 11/1990 | Daniel et al. | |
| 5,138,638 A | 8/1992 | Frey | |
| 5,227,874 A | 7/1993 | Von Kohorn | |
| 5,245,533 A | 9/1993 | Marshall | |
| 5,315,093 A | 5/1994 | Stewart | |
| 5,406,477 A * | 4/1995 | Harhen | 703/6 |
| 5,613,217 A | 3/1997 | Hagstrom et al. | |
| 5,692,107 A | 11/1997 | Simoudis et al. | |
| 5,826,252 A | 10/1998 | Wolters et al. | |
| 6,055,524 A | 4/2000 | Cheng | |

(Continued)

OTHER PUBLICATIONS

Swami, A., Building the business using process simulation, IEEE, New York, NY, Alexopoulos, C. Kang, K. Lilegdon, W.R. Goldsman, D. 1995 Winter Simulation Conference Proceedings (Cat. No. 95CB35865), ISBN: 0-7803-3018-8, Inclusive Page No. 1081-6.*

(Continued)

*Primary Examiner* — Jason Dunham
*Assistant Examiner* — Nancy Mehta
(74) *Attorney, Agent, or Firm* — Eric L. Sophir; Dentons US LLP

(57) ABSTRACT

A system, method, and article of manufacture is disclosed for determining optimal parameter settings for a business initiative testing model used for testing initiatives for business locations included in a business network. In one aspect, a method is disclosed that includes defining a first test type of a business initiative testing model having a set of parameter settings. Each parameter setting may include a set of one or more parameter setting options. The method may also include performing virtual tests on a set of virtual test sites based on the defined test type. Each virtual test site may reflect a selected business location in the business network. Also, the method may include determining a set of optimal parameter settings for the first test type of the business initiative testing model based on results from the virtual test. Moreover, the method may include configuring the business initiative testing model using the optimal parameter settings from the set for the first test type to test a business initiative to apply to the business network.

35 Claims, 27 Drawing Sheets

(56) References Cited

U.S. PATENT DOCUMENTS

| | | | |
|---|---|---|---|
| 6,078,891 A | 6/2000 | Riordan et al. | |
| 6,321,206 B1 | 11/2001 | Honarvar | 705/7 |
| 6,484,158 B1 | 11/2002 | Johnson et al. | |
| 6,553,352 B2 | 4/2003 | Delurgio et al. | |
| 6,708,156 B1 | 3/2004 | Von Gonten | |
| 6,801,818 B2 | 10/2004 | Kopcha | |
| 6,934,748 B1 | 8/2005 | Louviere et al. | 709/224 |
| 6,966,061 B1 | 11/2005 | Vance et al. | |
| 6,970,830 B1 | 11/2005 | Samra et al. | |
| 7,072,863 B1 | 7/2006 | Phillips et al. | |
| 7,080,027 B2 | 7/2006 | Luby et al. | |
| 7,092,896 B2 | 8/2006 | Delurgio et al. | |
| 7,155,398 B2 | 12/2006 | Thier | |
| 7,213,023 B2 | 5/2007 | Hadzikadic et al. | |
| 7,308,497 B2 | 12/2007 | Louviere et al. | |
| 7,412,398 B1 | 8/2008 | Bailey | |
| 7,451,065 B2 | 11/2008 | Pednault et al. | 703/2 |
| 7,526,434 B2 | 4/2009 | Sharp | |
| 7,546,246 B1 | 6/2009 | Stamm et al. | |
| 7,548,879 B2 | 6/2009 | Cash et al. | |
| 7,599,848 B2 | 10/2009 | Wefers et al. | |
| 7,689,456 B2 * | 3/2010 | Schroeder et al. | 705/7.31 |
| 7,689,459 B2 | 3/2010 | Capurso et al. | |
| 7,729,931 B1 | 6/2010 | Tobin | |
| 7,895,072 B1 | 2/2011 | Manzi et al. | |
| 7,904,327 B2 | 3/2011 | Phelan et al. | |
| 8,151,247 B2 * | 4/2012 | Wefers | 717/124 |
| 2001/0032105 A1 * | 10/2001 | Frye et al. | 705/7 |
| 2001/0042003 A1 | 11/2001 | Tanaka | |
| 2002/0069099 A1 | 6/2002 | Knox et al. | |
| 2002/0133250 A1 | 9/2002 | Kopcha | |
| 2002/0169665 A1 | 11/2002 | Hughes et al. | |
| 2003/0018510 A1 | 1/2003 | Sanches | |
| 2003/0023841 A1 | 1/2003 | Atherton et al. | |
| 2003/0046125 A1 | 3/2003 | Flores | |
| 2003/0046126 A1 | 3/2003 | Flores et al. | |
| 2003/0050830 A1 | 3/2003 | Troyer | |
| 2003/0069659 A1 | 4/2003 | Wada et al. | |
| 2003/0069782 A1 | 4/2003 | Chrisman et al. | |
| 2003/0110080 A1 | 6/2003 | Tsutani et al. | |
| 2003/0130883 A1 * | 7/2003 | Schroeder et al. | 705/10 |
| 2003/0176931 A1 | 9/2003 | Pednault et al. | |
| 2003/0177055 A1 | 9/2003 | Zimmerman, Jr. et al. | 705/10 |
| 2003/0195793 A1 | 10/2003 | Jain et al. | |
| 2003/0212584 A1 | 11/2003 | Flores | |
| 2004/0054511 A1 | 3/2004 | Turner et al. | |
| 2004/0143477 A1 | 7/2004 | Wolff | |
| 2004/0143480 A1 * | 7/2004 | Weiss et al. | 705/10 |
| 2004/0210471 A1 | 10/2004 | Luby et al. | |
| 2004/0243485 A1 | 12/2004 | Borenstein et al. | |
| 2004/0260624 A1 | 12/2004 | Chan et al. | |
| 2005/0039206 A1 | 2/2005 | Opdycke | 725/35 |
| 2005/0055275 A1 | 3/2005 | Newman et al. | |
| 2005/0060224 A1 * | 3/2005 | Ricketts | 705/11 |
| 2005/0075921 A1 * | 4/2005 | Hayes-Roth | 705/10 |
| 2005/0080609 A1 * | 4/2005 | Bhaskaran et al. | 703/22 |
| 2005/0108082 A1 | 5/2005 | Jenkinson | |
| 2005/0200476 A1 | 9/2005 | Forr et al. | |
| 2006/0105775 A1 | 5/2006 | Von Kaenel et al. | |
| 2006/0195370 A1 | 8/2006 | Howarth | |

OTHER PUBLICATIONS

John W. Mullins, The New Business Road Test: What entrepreneurs and executives should do before writing a business plan, An imprint of Pearson Education, Prentice Hall, Financial Times, Aug. 21, 2003.*

Avery, Jill, Steenburgh, Thomas J., Deighton, John, and Caravella, Marcy, "Adding Bricks to Clicks: The Contingencies Driving Cannibalization and Complementarity in Multichannel Retailing," Harvard Business School, 37 pp. Feb. 2009, http://papers.ssrn.com/sol3/papers.cfm?abstract_id=995657.

Amato-McCoy, D.. (Apr. 2010). Focus on: Business Analytics. Chain Store Age, 86(4), 71-73.

Applied Predictive Technologies Announces Launch of Adaptive Marketing Suite for Online and Brick-and-Mortar Channels. (Jan. 2). PR Newswire,1.

Bolton, Ruth N., & Drew, James H.. (1991). A Longitudinal Analysis of the Impact of Service Changes on Customer Attitudes Journal of Marketing, 55(1), 1.

Boosting Customer Response: Mercer Management Consulting and Applied Predictive Technologies Form Marketing Alliance. (Mar. 12, 2001). PR Newswire,1.

Campbell-Hunt, Colin, "What Have We Learned About Generic Competitive Strategy? A Meta-Analysis," Strategic Management Journal, vol. 21, No. 2 (Feb. 2000), pp. 127-154.

Cooper, Robert G. and Kleinschmidt, Elko J. "An Investigation into the New Product Process: Steps, Deficiencies, and Impact," Journal of Product Innovation Management,.1986, 3:71-85.

Eastlack, Joseph O., Jr., Rao, Ambar G., Dodson, Joe, & McNiven, Malcolm A.. (1989). Advertising Experiments at the Campbell Soup Company; Commentaries; Reply. Marketing Science, 8(1), 57.

Edgett, Scott J., "The New Product Development Process for Commercial Financial Services," Industrial Marketing Management 25, pp. 507-515 (1966).

Galbraith, Craig and Schendel, Dan, "An Empirical Analysis of Strategy Types,", Strategic Management Journal, vol. 4, No. 2 (Apr.-Jun. 1983). pp. 153-173.

Green, Paul E.; Frank, Ronald E.; Robinson, Patrick J. "Cluster Analysis in Test Market Selection," Management Science, vol. 13, No. 8, Series B, Managerial (Apr. 1967), pp. B387-B400.

Harrigan, Kathryn Rudie, "An Application of Clustering for Strategic Group Analysis," Strategic Management Journal, vol. 6, No. 1 (Jan.-Mar. 1985), pp. 55-73.

Kimes, Sheryl E., & Fitzsimmons, James A.. (1990). Selecting Profitable Hotel Sites at La Quinta Motor Inns. Interfaces, 20(2), 12.

Lu, Iva M. and Mantei, Marilyn M. , "Idea Management in a Shared Drawing Tool,", Proceedings of the Second European Conference on Computer-Supported Cooperative Work Bannon, L. Robinson, M. & Schmidt, K. (Editors), Sep. 25-27, 1991, Amsterdam, The Netherlands.

Mahajan, Vijay and Wind, Jerry, "New Product Models: Practice, Shortcomings and Desired Improvements,", Journal of Product Innovation Management, 1992; 9:128-139.

Rogers, David. (1992). A Review of Sales Forecasting Models Most Commonly Applied in Retail Site Evaluation. International Journal of Retail & Distribution Management, 20(4), 3.

Slater, Stanley F. and Olson, Eric M., "Marketing's Contribution to the Implementation of Business Strategy: An Empirical Analysis" Strategic Management Journal, vol. 22, No. 11. (Nov. 2001), pp. 1055-1067.

Szynal, Deborah. (Apr. 2002) New to you. Marketing News, 36(7), 23.

Thomas, Rhonda, R.; Barr, Richard S.; Cron, William L.; Slocum Jr., John W., "A process for evaluating retail store efficiency: a restricted DEA approach," International Journal of Research in Marketing 15, (1998) pp. 487-503.

Urban, Glen L. and Katz,Gerald M. "Pre-Test-Market Models: Validation and Managerial Implications," Journal of Marketing Research, vol. 20, No. 3 (Aug. 1983) pp. 221-234.

Volle, Pierre, "The short-term effect of store-level promotions on store choice, and the moderating role of individual variables", Journal of Business Research 53 (2001), pp. 63-73.

* cited by examiner

SELECT DATES FOR "TEST INITIATIVE" - MICROSOFT INTERNET EXPLORER aptRetailer NETWORK EXPLORER | MICRO MARKETER | NETWORK PLANNER | EXPERIMENTAL DESIGN      HOME | HELP | LOGOFF ···▶ ACTIVITY ANALYZER | BENCHMARKER | CLUSTER BUILDER      aptRetailer DEMO

CONFIGURE "TEST INITIATIVE"

ACTIVITY NAME: TEST INITIATIVE
ACTIVITY BLACKOUT DATES: 0 ACTIVITY-WIDE BLACKOUT DATES   ADD DATES «
PLEASE SELECT THE DATES THAT YOU WOULD LIKE TO ASSOCIATE WITH EACH SITE.
VIEWING SITES 1-26 OF 26 SITES

PAGE: 1   VIEW: ALL
SET ALL DATES ON THIS PAGE
TO DATE ENTERED IN FIRST ROW »

| SITE NO. | SITE NAME | BRAND | STATE CODE | START DATE (MM/DD/YYYY) | END DATE (MM/DD/YYYY) |
|---|---|---|---|---|---|
| 00074 | 76 CORPORATE WOODS | ATLANTIC | CALIFORNIA | 12 / 8 / 2001 | 12 / 8 / 2001 |
| 00090 | 176 SPRING VALLEY MARKETPLACE | ATLANTIC | CALIFORNIA | 12 / 8 / 2001 | 12 / 8 / 2001 |
| 00191 | 6671 AIRWAY BOULEVARD | ATLANTIC | WISCONSIN | 6 / 17 / 2001 | 6 / 17 / 2001 |
| 00292 | 7688 E FLORENCE AVE | ATLANTIC | MINNESOTA | 2 / 10 / 2001 | 2 / 10 / 2001 |
| 00568 | 327 INDIAN RIVER PARKWAY | ATLANTIC | ILLINOIS | 6 / 30 / 2001 | 6 / 30 / 2001 |
| 00629 | 1200 COUNTRYSIDE ROAD | ATLANTIC | CALIFORNIA | 1 / 6 / 2001 | 1 / 6 / 2001 |
| 00978 | 58 LECOUNT PLACE | ATLANTIC | ILLINOIS | 6 / 30 / 2001 | 6 / 30 / 2001 |
| 01137 | 5858 ADOBE ROAD | ATLANTIC | CALIFORNIA | 5 / 19 / 2001 | 5 / 19 / 2001 |
| 01374 | 10 BIKE PARK SOUTH | ATLANTIC | MINNESOTA | 2 / 10 / 2001 | 2 / 10 / 2001 |
| 01493 | 1580 SOUTH STREET | ATLANTIC | TEXAS | 8 / 6 / 2001 | 8 / 6 / 2001 |
| 01520 | 790 CITADEL DR EAST | ATLANTIC | TEXAS | 9 / 15 / 2001 | 9 / 15 / 2001 |
| 01647 | 71 HAYWOOD-BOX 430 | ATLANTIC | TEXAS | 1 / 17 / 2001 | 1 / 17 / 2001 |
| 01696 | SPOTSYLVANIA MALL | ATLANTIC | MINNESOTA | 9 / 3 / 2001 | 9 / 3 / 2001 |
| 01780 | GRAND CENTRAL ML-SP 269 | ATLANTIC | MINNESOTA | 2 / 10 / 2001 | 2 / 10 / 2001 |
| 02039 | 236 GREENSPOINT ML | ATLANTIC | DELAWARE | 6 / 30 / 2001 | 6 / 30 / 2001 |
| 02062 | 4769 JOHNSON-SPC 129 | ATLANTIC | CALIFORNIA | 5 / 26 / 2001 | 5 / 26 / 2001 |
| 02068 | 611 AIRPORT BLVD. SP. 1094 | ATLANTIC | TEXAS | 3 / 3 / 2001 | 3 / 3 / 2001 |
| 01186 | 69294 DOWNEY AVE | BRIGHTON | ILLINOIS | 6 / 16 / 2001 | 6 / 16 / 2001 |
| 01187 | 2377 S HACIENDA BLVD | BRIGHTON | IOWA | 9 / 22 / 2001 | 9 / 22 / 2001 |
| 01291 | 202 NORTHEAST WESTRIDGE ST | BRIGHTON | ARIZONA | 5 / 19 / 2001 | 5 / 19 / 2001 |

410 — << EDIT ACTIVITY SITES:
ADD/REMOVE INDIVIDUAL SITES

420 — SAVE EVENT >>
440 — SAVE AND ANALYZE EVENT >>

FIG. 4

ACTIVITY ANALYZER - MICROSOFT INTERNET EXPLORER aptRetailer NETWORK EXPLORER | MICRO MARKETER | NETWORK PLANNER | EXPERIMENTAL DESIGN  HOME | HELP | LOGOFF ⋯▶ ACTIVITY ANALYZER | BENCHMARKER | CLUSTER BUILDER  aptRetailer DEMO

TEST INITIATIVE.  CREATE COMMENTS>>

SELECT THE TYPE OF REPORT TO VIEW:
○ SUMMARY    METRIC        [SALES $ ▽] [WEEKLY ▽] ? ← 510
◉ DETAILED   CATEGORY: TOTAL  EDIT CATEGORY ≪ ← 520
             ☑ COMPARE USING % OF LAST YEARS PERFORMANCE

SELECT THE TIME FRAMES FOR COMPARISON:
THE DATES DISPLAYED HERE ARE DIFFERENT THAN THE DATES SAVED IN
THIS ACTIVITY. USE THE CHECKBOX TO RESTORE THE DATES IF NEEDED.

TEST START DATE:        [DEC▽] [26▽] [2002▽] 🗓   ← 540
TEST END DATE:          [FEB▽] [2 ▽] [2003▽] 🗓
                        ☐ RESTORE SAVED ACTIVITY DATES

COMPARISON START DATE:  [SEP▽] [3 ▽] [2002▽] 🗓
COMPARISON END DATE:    [SEP▽] [30▽] [2002▽] 🗓
                        SELECT DATES THAT DO NOT
                        OVERLAP THE TEST DATES.

SELECT THE CONTROL GROUP FOR THESE 27 SITES:
[CUSTOM CONTROL SELECTION... ▽]
[USING QUERIES ▽]                    ← 560

REMOVE OUTLIER SITES?
[YES, 95% CONFIDENCE ▽]              ← 550
WHEN REMOVED, OUTLIER SITES ARE DISPLAYED
SEPARATELY FROM THE TEST AND CONTROL SITES.

<< CANCEL        OR        ANALYZE ACTIVITY >>

FIG. 5

| TEST SITE | PERFORMANCE METRIC | ATTRIBUTES | | | | | |
|---|---|---|---|---|---|---|---|
| | | ATTRIBUTE 1 (NO. OF COMPETITOR STORES WITHIN 10 MILES) | ATTRIBUTE 2 (AVG. DISTANCE TO BUSINESS LOCATION IN NETWORK) | ATTRIBUTE 3 (AVG. MO. RENT) | ATTRIBUTE 4 (% POPULATION 18-24 W/N 5 MILES) | ... | ATTRIBUTE T |
| TS-1 | 15% (AVG. SALES INCREASE) | .81 | 12.02 | 15650 | .083 | ... | 1.34 |
| TS-2 | 10% (AVG. SALES INCREASE) | .96 | 10.13 | 12670 | .064 | ... | 1.56 |
| ... | ... | ... | ... | ... | ... | ... | ... |
| TS-X | (4%) (AVG. SALES INCREASE) | 1.78 | 8.32 | 16345 | .033 | ... | 2.45 |

*FIG. 8*

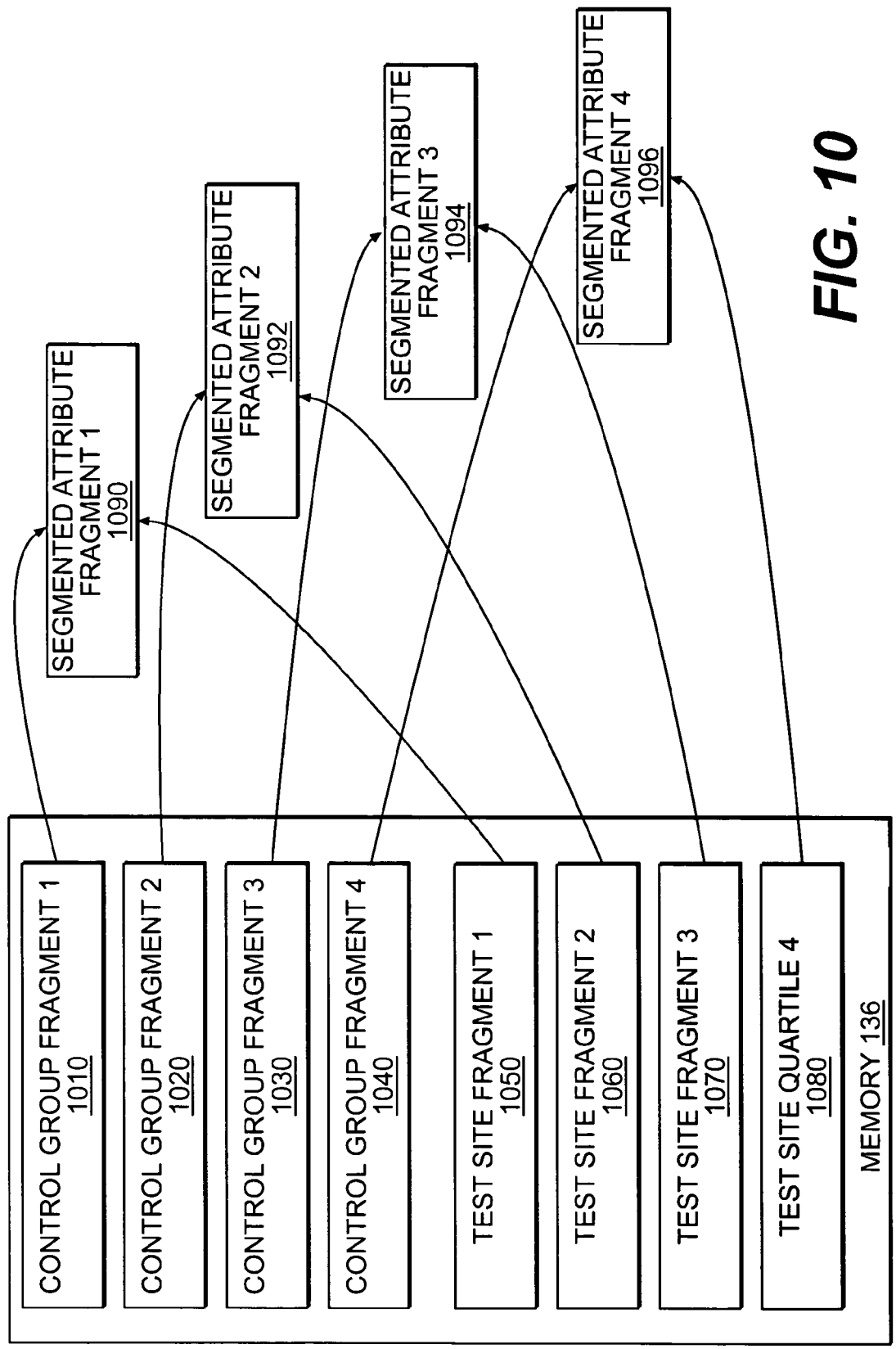

FIG. 11

| ATTRIBUTE NAME | TEST GROUP CORRELATION | CONTROL GROUP CORRELATION | IMPORTANCE FACTOR | 1-P VALUE |
|---|---|---|---|---|
| ? WEATHER - TOTAL PRECIP - 2002 | 38.45% | -13.16% | 3,098 | -- |
| ? LATITUDE | -44.72% | -0.39% | 2,661 | -- |
| ? DEMOG - ETHNICITY - % HISPANIC - 3 MI | 28.54% | -15.38% | 2,635 | -- |
| ? DEMOG - POP - MEDIAN AGE - TA | 41.23% | -2.45% | 2,621 | -- |
| ? DEMOG - ETHNICITY - % HISPANIC - 5 MI | 26.76% | -16.69% | 2,608 | -- |
| ? DEMOG - ETHNICITY - % HISPANIC ANCESTRY - TA | 28.70% | -14.61% | 2,599 | -- |
| ? WEATHER - AVG TEMP - 2002 | 43.20% | 1.50% | 2,503 | -- |
| ? DEMOG - ETHNICITY - % HISPANIC - 1 MI | 27.09% | -12.65% | 2,213 | -- |
| ? TOTAL # OF SECONDARY COMPETITORS - 5 MI | 37.44% | 2.54% | 2,095 | -- |
| ? DEMOG - POP - MEDIAN AGE - 1 MI | 38.06% | 0.58% | 2,087 | -- |
| ? VEHICULAR TRAFFIC COUNT | 31.18% | -2.92% | 2,036 | -- |
| ? DEMOG - %HHOLD INC $35,000 - $49,000 - TA | 36.00% | -2.59% | 2,005 | -- |
| ? DEMOG - HHOLDS - INC - %$035,000 - $049,999 5MI - % | 30.44% | -2.17% | 1,957 | -- |
| ? DEMOG - POP - MEDIAN AGE - 3 MI | 37.75% | 6.45% | 1,878 | -- |
| ? DEMOG - HHOLDS - 3 MI | 22.52% | -6.88% | 1,765 | -- |
| ? LONGITUDE | 14.22% | -15.13% | 1,762 | -- |
| ? DEMOG - POP - MEDIAN AGE - 5 MI | 37.14% | 8.28% | 1,732 | -- |
| ? NEWLY REMODELED STORE? (Y/N) | -35.56% | -7.54% | 1,682 | -- |

ESTIMATES FOR "ALL STORES" - MICROSOFT INTERNET EXPLORER

EXPORT TO:

VIEW ESTIMATES FOR SITES IN: ALL STORES

GROUP SITES BY: UPDATE

| SITE ID | SITE NAME | ACTUAL ACTIVITY PERFORMANCE | ACTUAL PERFORMANCE 02/03/2002 - 02/01/2003 | ESTIMATED PERFORMANCE 02/03/2002 - 02/01/2003 | ESTIMATED CHANGE IN PERFORMANCE 02/03/2002 - 02/01/2003 |
|---|---|---|---|---|---|
| 02202 | WILLOW PASS ROAD | | 1,069,219.71 | 3,395,403.46 | 217.56% |
| 02101 | 9993 WESTPARK AVE. | | 1,457,841.05 | 4,608,634.31 | 216.13% |
| 00468 | 188 EAGLE RIDGE DRIVE | | 1,025,689.38 | 3,213,515.78 | 213.30% |
| 00190 | 64375 QUORUM DRIVE | | 1,111,264.90 | 3,433,107.62 | 208.94% |
| 02153 | 1910 WELLS RD. SP. 1947 | | 629,380.38 | 1,932,203.55 | 207.00% |
| 03001 | 3393 DONNELL DR. | | 1,076,190.50 | 3,285,074.56 | 205.25% |
| 00211 | 9695 GULF FREEWAY | | 1,454,368.95 | 4,396,929.60 | 202.33% |
| 00568 | 327 INDIAN RIVER PARKWAY | 227.39 | 1,331,140.36 | 4,020,760.15 | 202.05% |
| 03004 | 3737 BRANCH AVE. | | 497,405.31 | 4,508,817.21 | 201.11% |
| 02076 | 612 SLIDE-BX-69213 | | 1,255,944.53 | 3,763,344.55 | 199.64% |
| 02194 | 712 LEXINGTON AVENUE | | 1,038,450.67 | 3,107,151.99 | 199.21% |
| 02100 | 907 COLUMBIA CENTER | | 1,295,071.49 | 3,825,633.32 | 195.40% |
| 02259 | 311 WACCAMAW BLVD #113 | | 1,069,172.18 | 3,152,794.84 | 194.88% |
| 03026 | 6711 GOVENOR RITCHIE HWY | | 843,730.87 | 2,462,814.08 | 191.90% |
| 03020 | 991 PIKE BUCKEYSTOWN PIKE | | 964,633.26 | 2,784,377.43 | 188.65% |
| 02267 | 1029 INDUSTRIAL PARK DR., STE4 | | 908,458.13 | 2,616,878.37 | 188.06% |
| 02223 | 2919 SOUTHDALE SC | | 560,075.86 | 1,574,566.02 | 181.13% |
| 02183 | 339 SUNRISE MALL | | 2,853,284.45 | 7,970,490.07 | 178.37% |
| 02235 | 1179 BURNSVILLE CTR | | 1,610,624.58 | 4,349,545.80 | 170.05% |
| 02034 | 6393 NEWBERRY RD-SPC-D3 | | 1,019,207.13 | 2,742,448.28 | 169.08% |
| 02157 | 491 E ALTAMONTE DR STE 337 | | 440,410.58 | 1,179,590.31 | 167.84% |
| 02200 | 3 EMBARCADERO CENTER, SUITE 41 | | 1,120,932.55 | 2,963,654.12 | 165.48% |
| 02181 | 264 BRIDGEWATER COMMONS | | 998,594.49 | 2,657,465.99 | 164.39% |
| 00329 | 6668 HOLMES AVE | | 394,974.63 | 1,033,624.14 | 162.35% |
| 02158 | 1031 SOUTHSIDE, STE 1126 | | 1,118,199.33 | 2,923,441.81 | 161.69% |
| 01335 | 711 SUMMIT ST | | 1,481,470.03 | 3,860,223.75 | 161.44% |
| 00183 | 4533 VALLEY VIEW LANE | | 577,043.06 | 1,499,731.33 | 160.57% |
| 02024 | 2024 INDEPNDNCE CTR | | 436,816.52 | 1,133,321.45 | 159.90% |
| 02065 | 290 SOUTH AVENUE | | 784,089.03 | 2,021,215.42 | 159.45% |
| 02234 | 297 WEST FARMS MALL | | 1,005,614.50 | 2,583,386.71 | 157.78% |
| 02167 | 9424 SW WASHNGTN SQ | | 1,046,147.22 | 2,675,760.84 | 156.90% |
| 02088 | 42 WHITTEN RD | | | | 155.77% |

ESTIMATES FOR "ALL STORES" - MICROSOFT INTERNET EXPLORER

ESTIMATES FOR "ALL STORES" GROUPED BY REGION

EXPORT TO: 🖼      🖶 PRINT REPORT

VIEW ESTIMATES
FOR SITES IN: ALL STORES
GROUP SITES BY: REGION ▽    UPDATE ≫

| VALUE | NUM. OF SITES | AVG. ACTUAL ACTIVITY PERFORMANCE | AVG. ACTUAL PERFORMANCE 02/03/2002-02/01/2003 | AVG. ESTIMATED PERFORMANCE 02/03/2002-02/01/2003 | AVG. ESTIMATED CHANGE IN PERFORMANCE 02/03/2002-02/01/2003 |
|---|---|---|---|---|---|
| REGION 16 | 139 | 140.87 | 726,280.33 | 1,087,011.83 | 49.67% |
| REGION 2 | 84 | 8.77 | 880,177.21 | 1,263,513.94 | 43.55% |
| REGION 12 | 151 | 0.21 | 904,436.97 | 1,281,487.39 | 41.69% |
| REGION 9 | 81 | — | 775,785.04 | 1,098,688.22 | 41.62% |
| REGION 5 | 123 | 10.03 | 820,255.08 | 1,161,282.39 | 41.58% |
| REGION 4 | 135 | 67.75 | 759,843.55 | 1,068,249.83 | 40.59% |
| REGION 10 | 92 | 40.76 | 898,875.27 | 1,221,043.35 | 35.84% |
| REGION 15 | 104 | 12.54 | 699,475.51 | 945,099.31 | 35.12% |
| REGION 3 | 126 | 6.64 | 653,393.83 | 873,311.42 | 33.66% |
| REGION 8 | 124 | — | 819,345.66 | 1,088,370.77 | 32.83% |
| REGION 1 | 105 | -1.90 | 775,368.24 | 992,037.92 | 27.95% |

| | | | | |
|---|---|---|---|---|
| FIRST PARAMETER SETTING | PARAMETER SETTING OPTION 1 | N1 | N2 | ... | N100 | NAVG |
| | PARAMETER SETTING OPTION 2 | N1 | N2 | ... | N100 | NAVG |
| | PARAMETER SETTING OPTION 3 | N1 | N2 | ... | N100 | NAVG |
| | PARAMETER SETTING OPTION 4 | N1 | N2 | ... | N100 | NAVG |
| SECOND PARAMETER SETTING | PARAMETER SETTING OPTION 1 | N1 | N2 | ... | N100 | NAVG |
| | PARAMETER SETTING OPTION 2 | N1 | N2 | ... | N100 | NAVG |
| | PARAMETER SETTING OPTION 3 | N1 | N2 | ... | N100 | NAVG |
| | PARAMETER SETTING OPTION 4 | N1 | N2 | ... | N100 | NAVG |
| THIRD PARAMETER SETTING | PARAMETER SETTING OPTION 1 | N1 | N2 | ... | N100 | NAVG |
| | PARAMETER SETTING OPTION 2 | N1 | N2 | ... | N100 | NAVG |
| | PARAMETER SETTING OPTION 3 | N1 | N2 | ... | N100 | NAVG |
| | PARAMETER SETTING OPTION 4 | N1 | N2 | ... | N100 | NAVG |
| FOURTH PARAMETER SETTING | PARAMETER SETTING OPTION 1 | N1 | N2 | ... | N100 | NAVG |
| | PARAMETER SETTING OPTION 2 | N1 | N2 | ... | N100 | NAVG |
| | PARAMETER SETTING OPTION 3 | N1 | N2 | ... | N100 | NAVG |
| | PARAMETER SETTING OPTION 4 | N1 | N2 | ... | N100 | NAVG |

METHODS, SYSTEMS, AND ARTICLES OF MANUFACTURE FOR DETERMINING OPTIMAL PARAMETER SETTINGS FOR BUSINESS INITIATIVE TESTING MODELS

RELATED APPLICATION

This application is a continuation-in-part of U.S. patent application Ser. No. 10/767,191, entitled "Methods, Systems, and Articles of Manufacture for Analyzing Initiatives for a Business Network," and filed Jan. 30, 2004 now U.S. Pat. No. 8,010,399, which is hereby incorporated by reference in its entirety.

DESCRIPTION OF THE INVENTION

1. Field of the Invention

This invention relates to business initiative analysis systems, and more particularly, to methods, systems, and articles of manufacture for performing a segmented initiative analysis for initiatives implemented at selected business locations in order to identify in which other locations to implement the initiative. Further, this invention relates to methods and systems for determining optimal parameter settings for business initiative testing models.

2. Background of the Invention

For as long as retailers have been selling products and services, they have been seeking ways to increase profits. Accordingly, many retailers create new initiatives that they believe will have a positive impact on profits. These initiatives usually cover various aspects of business operations that drive profits. For example, retailers may change product prices, move products to different locations of a sales floor, change the amount of space allocated to each product, test new products, add or reduce staff, introduce new concepts (e.g., in-store kiosks), remodel older stores, and test new marketing campaigns. Retailers may test these new initiatives in selected test locations (i.e., certain stores) and subsequently determine whether to introduce the initiatives to remaining business locations based on the success of the initiatives at the selected test locations. Historically, retail management has used business instinct and/or anecdotal evidence to assess the success of the initiatives in order to make a decision whether to implement the initiatives at the rest of its business locations.

In recent years, however, some retailers have become more structured and analytical in their set up and analysis of tests. These retailers collect performance metrics, such as sales and gross profit data from the test locations and analyze the data using conventional software products, such as spreadsheet or statistical software packages. Retailers may measure the change in the performance metrics at the locations that introduced the new initiatives relative to a change in the same metrics at a control group of locations that did not implement the initiatives. In doing so, the retailers attempt to identify the impact of the initiatives on the performance metrics in order to determine whether they provide a positive return on investment. This allows these retailers can make an informed decision whether to extend the concept to remaining locations in a business network. However, the way in which the analyst at the retailer sets up this analysis will have an effect on the perceived results. For example, the analyst has to decide which of the stores that did not implement the initiative should serve as the control group and the analyst has to decide what time periods to use in measuring impact. Retailers often define one or more parameters for their analysis in a manner that seems intuitive, but lack empirical evidence that the parameters are in fact optimized for isolating the impact of an initiative. As a result, retailers may not recognize and filter inconsistent data, and therefore be less able to measure the impact of their initiatives.

Accordingly, there is a need for a system and method that automatically identifies one or more analytical parameters that filter out the most inconsistent data to maximize a retailer's ability to analyze the results of an initiative test. Using more consistent data allows retailers to better identify those initiatives to extend to certain locations that will provide the most anticipated profit gains.

SUMMARY OF THE INVENTION

Methods and systems consistent with certain aspects of the present invention identify optimum parameter settings for initiative testing models.

In one aspect of the invention, a method is provided for determining parameter settings for business initiative testing software used for testing initiatives for business locations included in a business network. In one aspect, the method includes defining a first test type of a business initiative testing model having a set of parameter settings. Each parameter setting may include a set of one or more parameter setting options. The method may also include performing a virtual test on a set of virtual test sites based on the defined test type. Each virtual test site may reflect a selected business location in the business network. Also, the method may include determining a set of optimal parameter settings for the first test type of the business initiative testing model based on results from the virtual test. Moreover, the method may include configuring the business initiative testing model using the optimal parameter settings from the set for the first test type to test a business initiative for application in the business network.

In another aspect of the invention, a system is provided for determining parameter settings for business initiative testing software used for testing initiatives for business locations included in a business network. In one aspect, the system may include a computer configured to define a first test type of a business initiative testing model having a set of parameter settings. Each parameter setting including a set of one or more parameter setting options. Further, the computer is configured to execute a virtual test on a set of virtual test sites based on the defined test type. Each virtual test site may reflect a selected business location in the business network. Also, the computer may determine a set of optimal parameter settings for the first test type of the business initiative testing model based on results from the virtual test. Also, the computer may configure the business initiative testing model using the optimal parameter settings from the set for the first test type to a test on a business initiative to apply to the business network.

In another aspect, a computer-readable medium is disclosed that includes instructions for, when executed by a processor, performing a method for determining parameter settings for business initiative testing software used for testing initiatives for business locations included in a business network. In one aspect, the method includes defining a first test type of a business initiative testing model having a set of parameter settings. Each parameter setting may include a set of one or more parameter setting options. The method may also include performing a virtual test on a set of virtual test sites based on the defined test type. Each virtual test site may reflect a selected business location in the business network. Also, the method may include determining a set of optimal parameter settings for the first test type of the business initiative testing model based on results from the virtual test. Moreover, the method may include configuring the business initiative testing model using the optimal parameter settings from the set for the first test type to test a business initiative to apply to the business network.

Additional aspects of the invention will be set forth in part in the description which follows, and in part will be obvious from the description, or may be learned by practice of methods, systems, and articles of manufacture consistent with features of the present invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

FIG. 4 shows a screen shot of an exemplary test site selection web page, consistent with certain aspects of the present invention;

FIG. 5 shows a screen shot of an exemplary analysis set up web page, consistent with certain aspects of the present invention;

FIG. 8 shows an exemplary test site attribute table, consistent with certain aspects of the present invention;

FIG. 10 shows a block diagram of a segmented attribute quartile comparison process, consistent with certain aspects of the present invention;

FIG. 11 shows a screen shot of an exemplary attribute table web page, consistent with certain aspects of the present invention;

FIG. 16 shows an exemplary business location analysis table, consistent with certain aspects of the present invention;

FIG. 17 shows an exemplary business region analysis table, consistent with certain aspects of the present invention;

FIG. 23 shows a block diagram of an exemplary data structure with selected optimal parameter setting options, consistent with certain aspects of the present invention;

FIG. 24 shows a block diagram of another exemplary data structure, consistent with certain aspects of the present invention;

FIG. 25 shows a block diagram of another exemplary data structure with selected optimal parameter setting options, consistent with certain aspects of the present invention.

DETAILED DESCRIPTION

Figure 1:
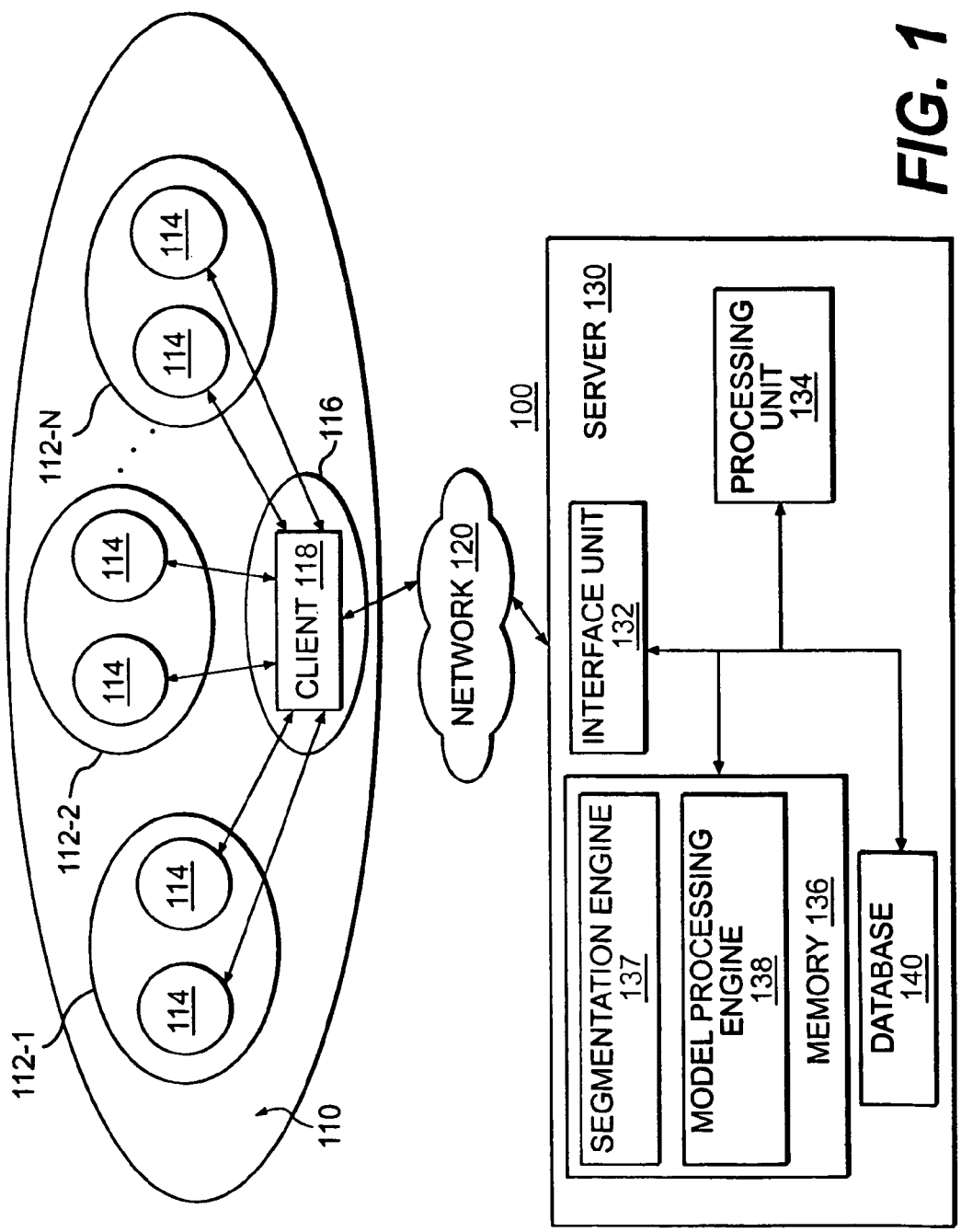
FIG. 1 illustrates an exemplary system environment in which methods, systems, and articles of manufacture, consistent with features and principles of the present invention may be implemented.

Methods, systems and articles of manufacture consistent with certain aspects of the present invention identify business locations that respond most positively to a tested initiative and build a model based on the common attributes of those identified test sites to predict the impact of the tested initiative on other locations in a business network.

In one aspect of the invention, a server is disclosed for performing one or more processes for analyzing a business initiative for a business network including business locations having a set of test sites that have implemented the business initiative for a predetermined test period and a set of control group sites that did not have the initiative implemented. Each of the sites have an associated set of attributes reflecting various characteristics corresponding to the respective site, such as geographical location, size of business location, number of employees, etc. In one aspect of the invention, the server collects from a client a performance value for each of the test and control group sites reflecting a level of performance of each site during the test period. The server then calculates the change in performance in the test sites during the test period, relative to the change in performance in the control group sites over the same time period. The server may segment the performance values for each test site attribute to identify those attributes that have a greater impact on the performance values of the test sites than other attributes. Further, the system configures a model for predicting the performance values of the test sites using the identified attributes and determines whether the model accurately predicts these performance values. If so, the server applies the model to all non-tested sites (i.e., all sites in business network 110 excluding the test sites) to predict the performance values of each site. Based on the predicted performance values, a user operating the client or associated with the business network may select one or more of those sites to implement the business initiative.

Reference will now be made in detail to the exemplary aspects of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instructions or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

I. SYSTEM OVERVIEW

FIG. 1 illustrates an exemplary system environment 100 in which certain aspects related to the present invention may be implemented. As shown, system environment 100 may include a business network 110, network 120, and a server 130.

Business network 110 represents a network of businesses that provide similar products and/or services to customers. The businesses may be geographically dispersed. Business network 110 may include one or more business regions 112-1 to 112-N that represent different geographical locations, such as cities, counties, states, country regions, virtual boundaries having a predetermined bounded distance (e.g., 100 mile radius), and any other type of defined region within a particular location. Each region 112-1 to 112-N may include one or more business locations 114 that represent retailers that sell products and/or services associated with business network 110. For example, business network 110 may represent a grocery store chain that includes a plurality of stores geographically dispersed among a state of the United States. Each region 112-1 to 112-N may represent locations that include grocery stores in the chain (e.g., business locations 114) that are within a predetermined distance of one another (e.g., 100 mile radius).

Also included in business network 110 is business management unit 116, which represents a business entity that manages business network 110. For example, business management unit 116 may be an organization headquarters or a marketing division for business network 110. Unit 116 may include one or more clients 118 that are operated by one or more users associated with business network 110 that perform various management and/or marketing duties for business network 110. Following the above example, business management unit 110 may be a marketing division of the exemplary grocery store chain that determines which products and/or services each retailer location (e.g., 114) should provide.

In one aspect of the invention, client 118 may be one or more computer systems such as a desktop computer, workstation, laptop, personal digital assistant or any other similar computing system operated by a user. Client 118 may include a processor, associated memory, and other elements and functionalities available in computer systems (all not shown). These elements may include input/output devices, such as a keyboard, mouse, and display, although these input means may take other forms. Also, client 118 may include a network interface for communicating with external resources, such as network 120 and server 130. Further, client 118 may execute browser software that enables a user to request, receive, and render information from network 120.

Although FIG. 1 shows business network 110 including a single business management unit 116 (and accompanying client 118), each business location 114 may include a client 118 that is capable of accessing network 120 and server 130 to access and perform processes consistent with certain aspects related to the present invention. Further, although business network 110 is shown including a plurality of regions 112-1 to 112-N, network 110 may include business locations 114 that are all included within a single region.

Network 120 may be a shared, public, or private network and encompasses a wide area or local area. Network 120 may be implemented through any suitable combination of wired and/or wireless communication networks. For example, network 120 may be implemented through a Wide Area Network ("WAN"), Local Area Network ("LAN"), an intranet and/or the Internet. Further, network 120 may represent multiple networks, such as a wireless carrier network connected to the Internet.

Server 130 may be a computer system such as a desktop computer, workstation, or any other similar server side computing system that performs one or more server-side processes. In one aspect of the invention, server 130 may include, among other things, interface unit 132, processing unit, 134, memory 136, and database 140. Although server 130 is shown including elements 132-140, it may include additional computing elements, such as an input/output device (e.g., display, mouse, keyboard) that enables a user to access the data and software in server 130. In addition, server 130 may be a group of servers.

Interface unit 132 may be one or more hardware and/or software components that are configured to receive and send information from/to network 120. Interface unit 132 may include, or leverage, different types of software to control access to information maintained by server 130. For example, interface unit 132 may execute firewall software that controls access to information and processes provided by server 130 using one or more security protocols (e.g., password processing, encryption technologies, etc. The above listed functionalities are not intended to be limiting and interface unit 132 may perform other types of interface processes to facilitate the exchange of information between server 130 and network 120.

Processing unit 134 may be one or more processing devices that execute software processes stored in one or more memory devices, such as memory 136. Further, processing unit 134 may execute software processes stored internally, such as internal flash memory configured within processing unit 134.

Memory 136 may be one or more memory devices that store data and software programs that, when executed by processing unit 134, perform processes consistent with certain aspects related to the present invention. These programs may include segmentation engine 137, and model processing engine 138. Further, memory 136 may include server-side software applications that enable server 130 to create and provide content including information produced by other programs executed by processing unit 134, such as web server software. Alternatively, server 130 may leverage web server software that is located in another memory device (not shown) internal or external to server 130. The above software programs and functionalities are not intended to be limiting and memory 136 may be configured to store additional or fewer types of data and/or software programs that perform other processes consistent with server-side computing systems.

Database 140 may be one or more memory devices that store data and/or executable software that is used by server 130 to perform processes consistent with certain aspects related to the present invention. For example, database 140 may include one or more data structures (e.g., tables, maps, arrays, directories, etc.) that include data that is used by one or more of the software programs stored in memory 136 and executed by processing unit 134. Although server 130 shows database 140 and memory 136 as separate elements, the information and software stored in these elements may be combined in a single memory device. Also, memory 136 and/or database 140 may be located external to server 130 and accessible through network 120 or a dedicated back-end communication path, such as a Local Area Network (LAN).

II. INITIATIVE ANALYSIS PROCESS

Figure 2:
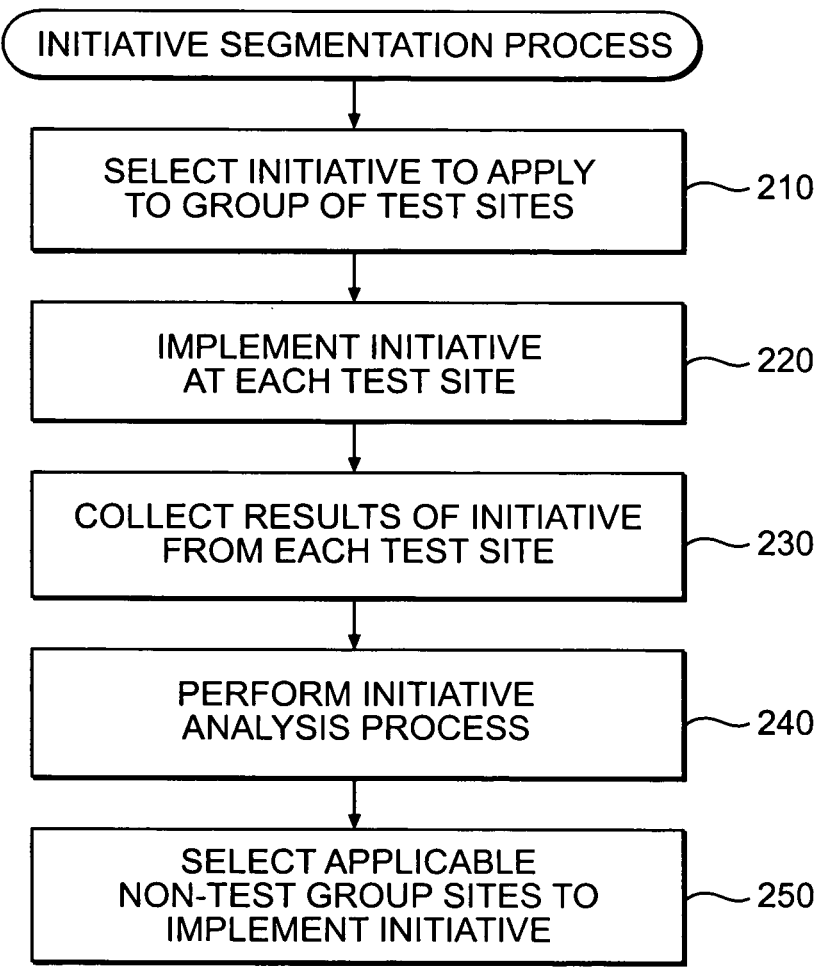
FIG. 2 illustrates a flowchart of an exemplary initiative segmentation process, consistent with certain aspects of the present invention.

Methods, systems, and articles of manufacturer consistent with aspects of the present invention enable one or more users of client 118 to access functionalities offered by server 130 to determine retail strategies associated with business network 110. For example, a user in business management unit 116 may execute browser software in client 118 to request analysis information regarding one or more initiatives implemented at one or more business locations 114. FIG. 2 shows an exemplary initiative segmentation process that may be performed by methods, systems, and/or articles of manufacture consistent with aspects of the present invention.

Initially, a user or users at business management unit 116 may create and select an initiative that is to be applied to a predetermined number of test sites reflecting a set of business locations 114 (e.g., thirty stores) included in business network 110 (Step 210). The proposed initiative may be a change in store layouts, offering different products and/or services, different marketing campaigns (e.g., advertising, etc.), and any other type of idea that may be implemented at the selected test sites.

The user of business management unit 116 may then direct the selected test sites to implement the proposed initiative (Step 220). The initiative may be implemented for a predetermined amount of time (e.g., three months, six months, etc.), which is also known as a test period. Alternatively, the initiatives may be implemented at the test sites indefinitely. During the test period, business management unit 116 may collect feedback results from each test site based on one or more performance metrics selected by unit 116 (Step 230). For example, business management unit 116 may request sales information, foot traffic (i.e., number of persons entering a business location), etc. from each test site during the test period and may request additional performance data for each test site for a period before the test period.

Once the appropriate feedback results are collected, a user at business management unit 116 may use client 118 to perform an initiative analysis process based on the results (Step 240). The initiative analysis process provides information regarding the effectiveness of the initiative at the test sites. Further, the initiative process provides information regarding a proposed effectiveness of the initiative if implemented in other non-tested business locations in business network 110 (i.e., retailer locations that did not implement the initiative). These other business locations may be referred to as non-test group sites. In one aspect of the invention, the initiative analysis process includes the exchange of information between client 118 (under the operation of a user) and server 130. For example, a user operating client 118 may use browser software to access a web site that is provided or leveraged by server 130 to perform the initiative analysis process. Accordingly, server 103 may provide content to client 118 that includes queries, data, and analysis information associated with the initiative analysis process.

A user, such as a manager at business management unit 116, or software processes may analyze the information provided by server 130 and selects one or more applicable non-test group sites to implement the initiative (Step 250). Accordingly, business management unit 116 determines and implements one or more strategies associated with the tested initiative in a selected number of business locations 114, and/or groups of locations, such as regions 112-1 to 112-N.

In certain aspects, client 118 may download information to server 130 associated with the results of the test initiatives at the test sites. Further, server 130 may receive, or retrieve, attributes associated with each business location 114 from client 118, such as store size, locations, sale data, types of products and/or service offered, location and distances of competing merchant sites, age of the business location, amount of a lease (if any), weather during the test period, staff information, etc. Alternatively, or in addition to the information provided by client 118, server 130 may execute software that determines, collects, and/or retrieves attribute information associated with business network 110, regions 112-1 to 112-N (e.g., population and demographic data, etc.), and business locations 114. The attribute information may be stored in database 140 for subsequent use by server 130 and/or client 118.

Figure 3A:
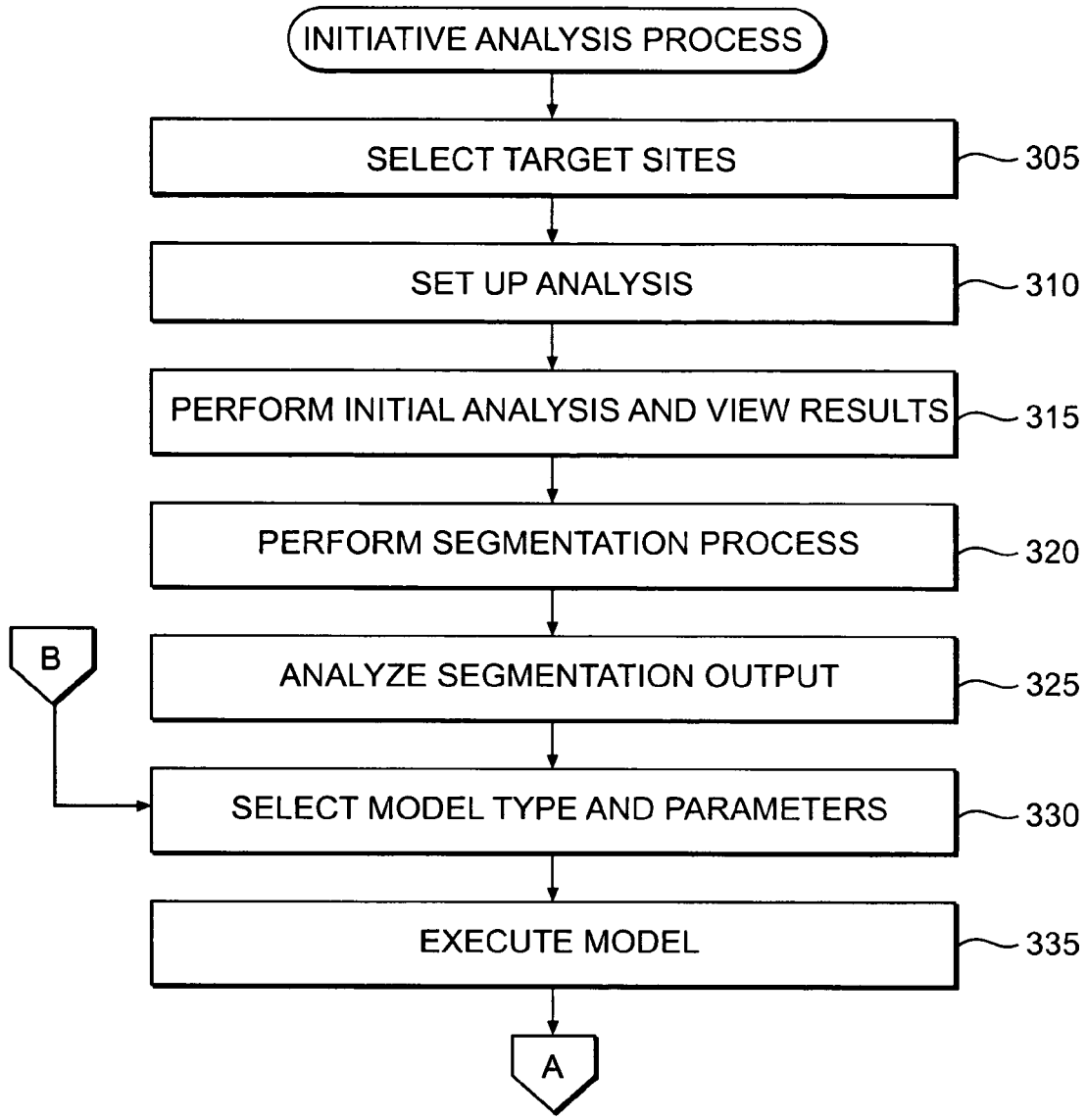
FIGS. 3A and 3B illustrate flowcharts of an exemplary initiative analysis process, consistent with certain aspects of the present invention.
Figure 3B:
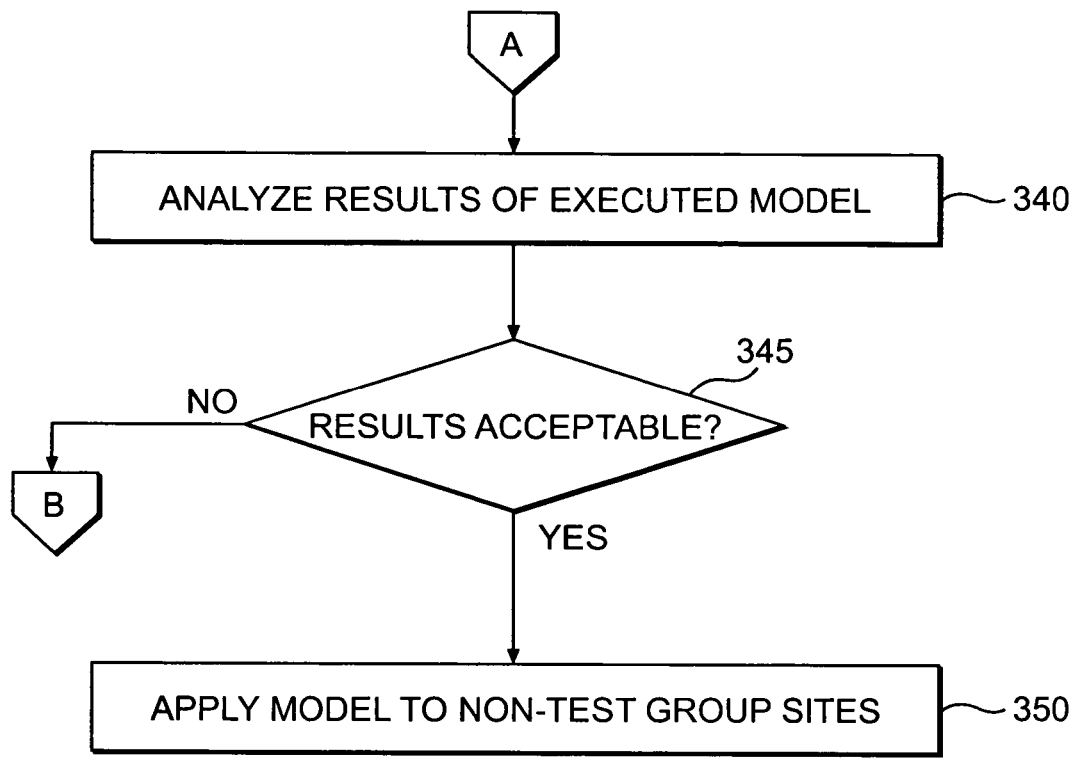

FIGS. 3A and 3B show a flowchart of an exemplary initiative analysis process, consistent with certain aspects of the present invention. As explained above in connection with FIG. 2, a user operating client 118 may access server 130 through browser software. In one aspect of the invention, server 130 may leverage web server software that creates and renders web page content that includes information associated with the initiative analysis process. For example, the initiative analysis process may begin with a user of client 118 receiving a web page including a list of target sites that implemented the initiative and provided feedback results to client 118. FIG. 4 shows an exemplary screen shot of a test site selection web page including a list of test sites 410, the location of each test site 420, the type of each test site (not shown), and a query section for proposed dates the user may select to perform an analysis 440. From this information, the user may select the test sites from which server 130 is perform an initiative analysis (Step 305).

Once the test sites are selected, server 130 may provide client 118 with information that enable the user to set up the initiative analysis (Step 310). FIG. 5 shows an exemplary screen shot of an analysis setup page that allows the user to define one or more items associated with the initiative analysis process. For example, in setting up the analysis, the user may select one or more performance metrics 510 from which the user wishes to use in its analysis. A performance metric may include sales data in dollars (change in average sales during the predetermined test time period), gross profit margins, number of products sold, and any other type of metric associated with the performance of the business locations 114. Further, server 130 may allow the user to select a product/service category 520 for the analysis, such as a type of product, all products, etc.

In addition to performance metrics and categories, the user may select time periods 540 from which the initiatives were implemented by the test sites. Also, the user may request that server 130 eliminates any initiative feedback data that appear to be anomalous by removing any outlier sites (selection 550). An outlier site has performance values that are too different than the rest of its respective test or control group. The user determines a threshold performance value beyond which a site is considered to be too different than its peers and thus deemed an outlier by server 130. By removing outlier test sites from consideration, the initiative analysis process does not consider the information for this test site during its analysis operations.

Additionally, or alternatively, the user may select a control group 560 of business locations in the network 110 that have not implemented the initiative. For example, the user may select to have all or a portion of the remaining business locations considered in the analysis process, or request that the server select a group of sites that are most similar to the test group of sites in which the initiative was implemented. This group of stores selected by the user or server 130 is the control group.

Figure 6:
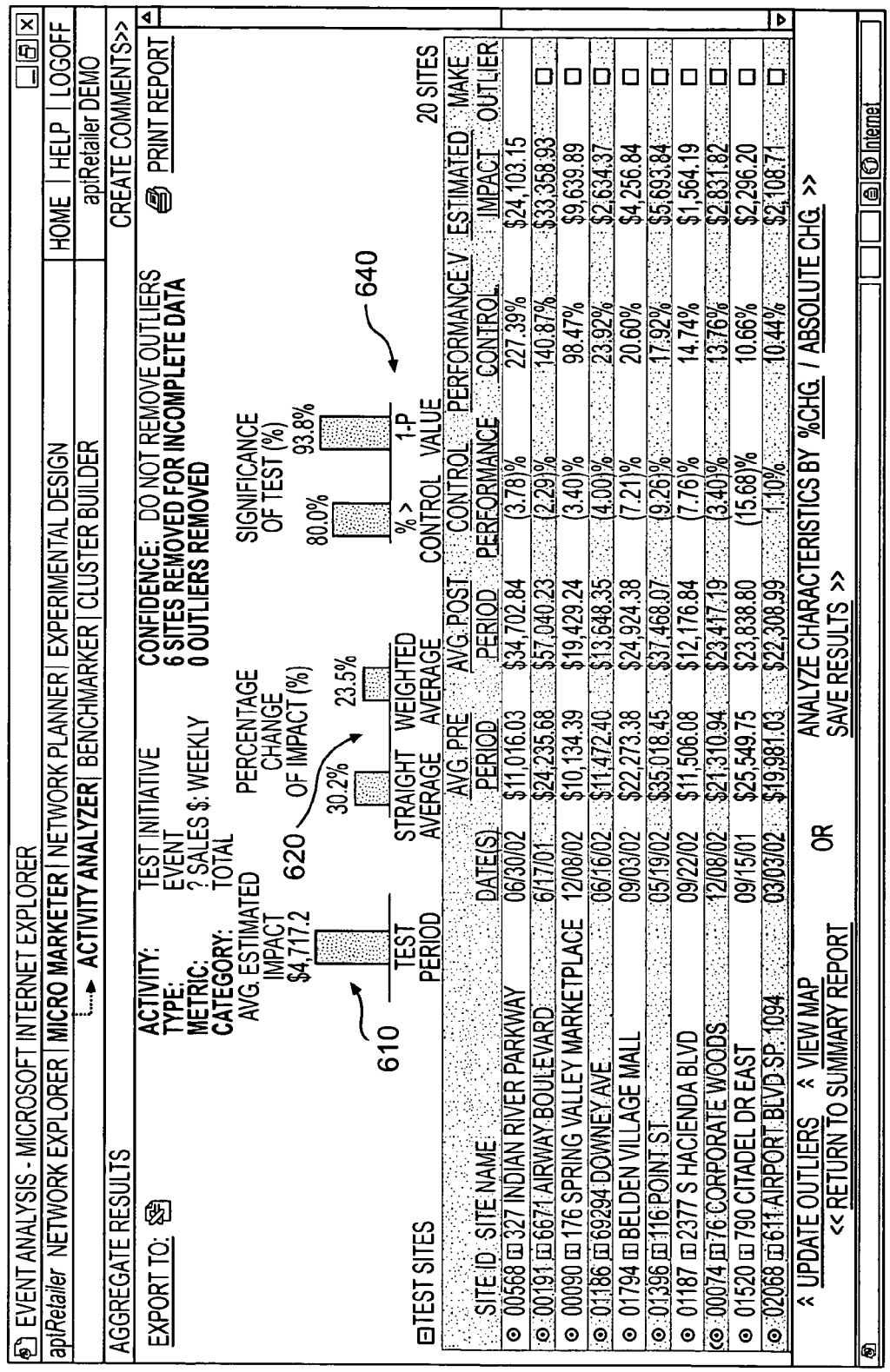
FIG. 6 shows a screen shot of an exemplary initial analysis results web page, consistent with certain aspects of the present invention.

Once the user has set the appropriate performance metrics, categories, etc. for the initiative analysis process, server 130 may perform an initial analysis on the test site initiative result data (Step 315). In one aspect, server 130 may determine a performance value for each test site as well as the control group sites for each performance metric and category selected by the user. The performance value of a test site may be measured as a change in a performance metric/category combination for each test site relative to the change in the control group sites over a common time period. Once server 130 determines the performance values for the test sites, it may provide the results of the initial analysis to, user via client 118. FIG. 6 shows an exemplary screen shot of an initial analysis results web page including data reflecting the results of the initial analysis process.

As shown in FIG. 6, server 130 may provide information associated with the performance (e.g., performance values) of the test sites relative to the control group sites for the selected performance metric. In the exemplary screen shot of FIG. 6, server 130 provides the user with performance metric value changes in absolute values (e.g., actual dollars in sales) (e.g., graph 610), and in percentage values (e.g., graph 620). Further, server 130 may determine the average change in the selected performance metric for the test sites relative to the change in the same performance metric for the control group sites. This may be displayed in graph form as well. Additionally, server 130 may determine the likelihood that the performance of the test group relative to the control group of sites is not random chance. Server 130 may provide such confidence values to the user as a 1-p value (e.g., graph 640). The confidence value may be determined based on information reflecting a difference between test site performance metric data and control group site performance metric data.

Once server 130 completes the initial analysis process and provides the results of this process to the user, it may execute a segmentation process consistent with certain aspects related to the present invention (Step 320). The segmentation process may direct processor unit 134 to access the attributes associated with business locations 114 stored in database 140. Once accessed, the segmentation process sorts through the attributes to identify those that most strongly relate to the different test site's performance values during implementation of the initiative. In one aspect, server 130 may determine the strength of the relationship between each attribute and differential performance by test site (e.g., the attributes that are most in common among the top performing test sites and most different than the worst performing test sites).

III. SEGMENTATION PROCESS

Figure 7:
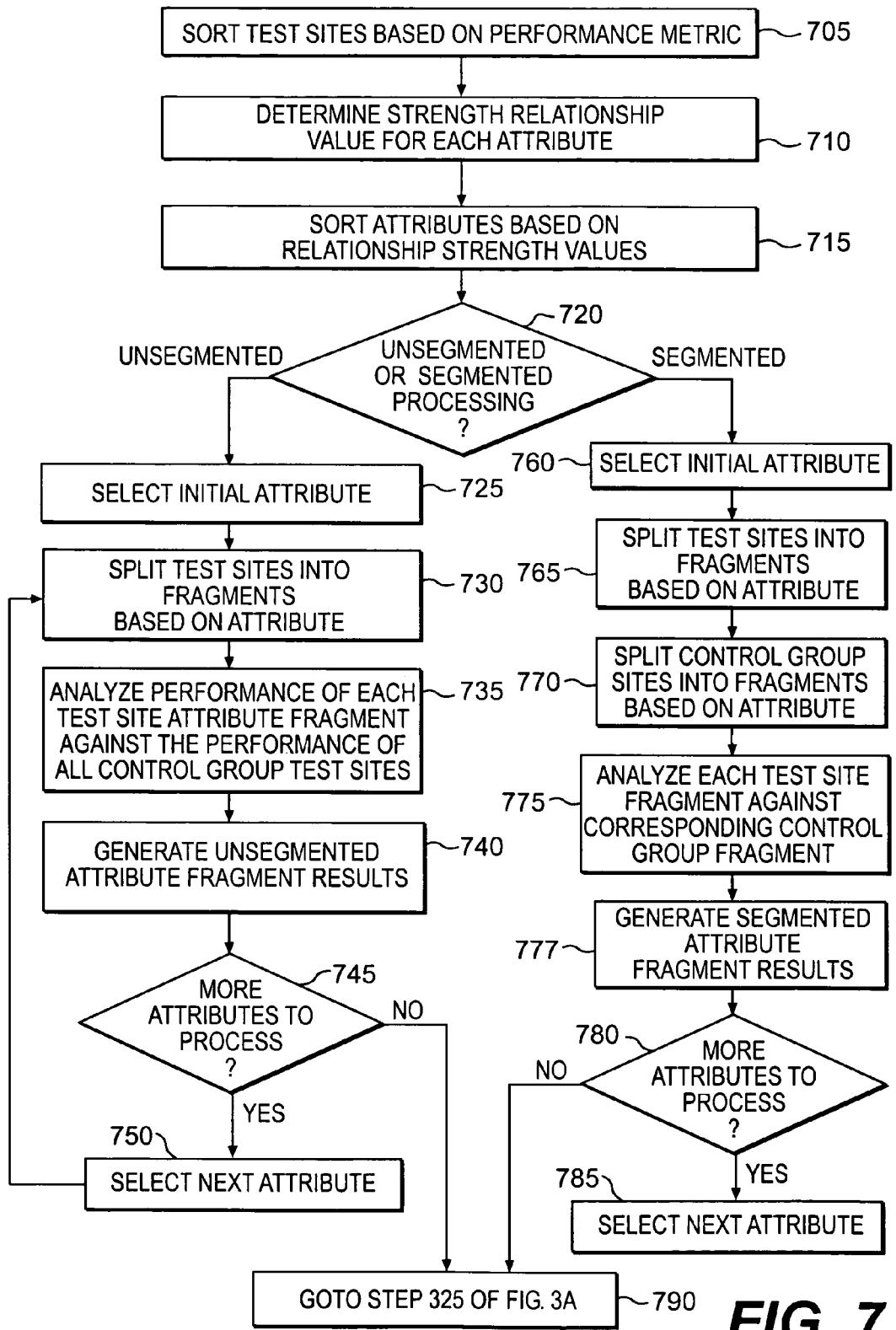
FIG. 7 illustrates a flowchart of an exemplary segmentation process, consistent with certain aspects of the present invention.

FIG. 7 shows a flowchart of an exemplary segmentation process consistent with certain aspects of the present invention. To segment the test site results, server 130 may execute segmentation engine 137 that initially sorts the test sites based on their corresponding performance metric results (Step 705). For example, if the selected performance metric is an average percentage of sales difference over a predetermined test period, then segmentation engine 137 may sort the test sites from highest to lowest average sales difference. FIG. 8 shows an exemplary test site attribute table including a sorted list of selected test sites 801 based on their corresponding performance metric performance values 802. Each test site is associated with one or more attributes 803 that correspond to some characteristic related to the test sites. Accordingly, segmentation engine 137 may determine a measurement of the strength of the relationship between each attribute 803 and the performance metric values 802 of test sites 801 (Step 710). In one aspect, segmentation engine 137 will use statistical processes to determine the strength of the relationship between the attributes 803 and performance metrics 802. For example, segmentation engine 137 may analyze the correlation and R-squared of each attribute to the performance of the test group sites. In such an example, the server 130 would create a scatter plot graph for each attribute. Data points in the scatter plot are associated with individual test sites. Server 130 plots the site's value for a selected attribute 803 on the x-axis and plots the value for the selected performance metric 802 on the y-axis. Server 130 then determines and places a regression line through the scatter plot to calculate the correlation and r-squared values of that regression line. These values (i.e., correlation and r-squared values) indicate the strength of the relationship between the selected attribute 803 and the performance metric 802. Server 130 repeats this process for every attribute. In one aspect, server 130 determines positive and/or negative correlations. A positive correlation means that as the value of an attribute increases, the value of the selected performance metric also increases. A negative correlation means that as the attribute value increases, the value of the selected performance metric decreases.

Once determined, segmentation engine 137 may sort the attributes based on the strength relationship values (Step 715). The sorting allows segmentation engine 137 to have a prioritized list of attributes that are ranked based on their relationship with the performance of the test sites. Thus, referring to FIG. 8, if segmentation process 137 determines that attribute 1 has the strongest relationship with the average sales difference of test sites 801 when compared to other attributes, that attribute may be ranked first in the list.

In certain aspects, segmentation engine 137 may perform an unsegmented or segmented process on the attributes and test sites. Unsegmented processing involves analyzing the performance of each test site against the performance of all control group sites. Segmented processing involves analyzing the performance of each test site against the performance of control group test sites having similar attribute relationships. Steps 725-750 and 760-785 demonstrate the differences between the two processes.

If segmentation engine 137 is directed or configured to perform unsegmented processing (Step 720; UNSEGMENTED), an initial attribute may be selected for processing (Step 725). Segmentation engine 137 may analyze the performance metric values associated with the selected attribute and splits the test sites into fragments that represent sets of test sites that are divided based on the statistical rank of their performance metric values (Step 730). In one aspect of the invention, segmentation engine 137 separates the test sites into quartiles, quintiles, or any number of fragments. Segmentation engine 137 may then analyze the performance metric values of each test site attribute fragment against the performance of all control group test sites (Step 735). Based on the analysis, segmentation engine 137 may generate unsegmented attribute fragment results, which may include a resultant map of fragments representing the difference between the performance metrics of each test site fragment and all of the control group sites (Step 740). This information may be stored in memory 136 or database 140.

In one aspect of the invention, segmentation engine 137 may also determine a value representing a relationship between the performance of the test sites (i.e., performance metric) and the selected attribute. For example, segmentation engine 137 may determine the 1-p value of the relationship between the performance of the test sites (i.e., performance metric) and the selected attribute. The 1-p value represents the probability that the relationship between the attribute and the performance metric (either positive or negative) is not random chance.

Figure 9:
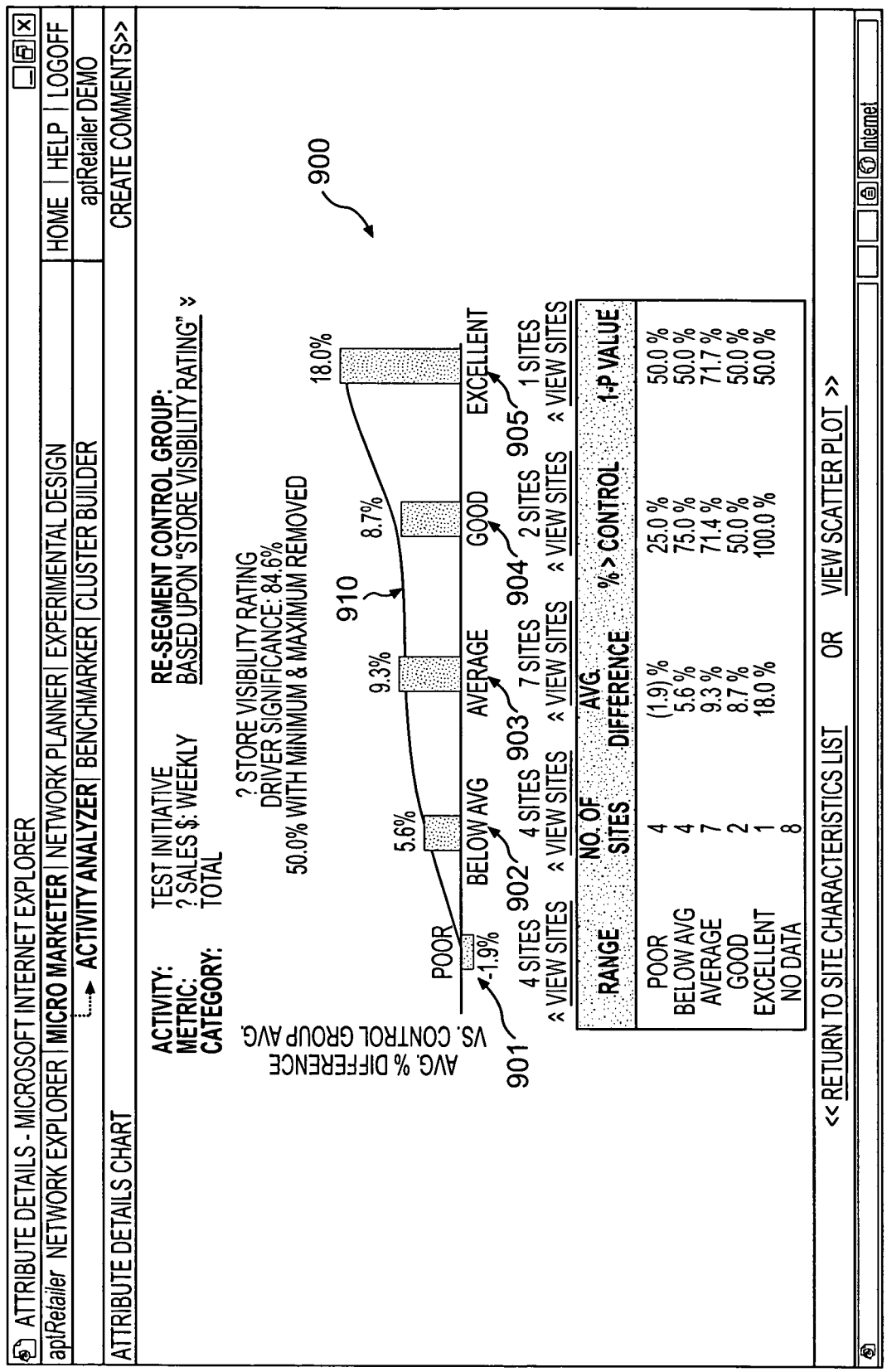
FIG. 9 shows an exemplary unsegmented attribute quartile result graph, consistent with certain aspects of the present invention.

FIG. 9 shows a graph 900 reflecting a relationship between the performance of the test sites (i.e., performance metric) and a selected attribute. As shown, graph 900 includes a number of fragments 901-905 reflecting the unsegmented attribute fragment results computed by segmentation engine 137. For this exemplary attribute, line 910 shows a positive correlation between the performance metric values and the attribute values.

If there are more attributes 803 to process (Step 745; YES), then segmentation engine 137 may select another attribute (Step 750) and the unsegmented process continues at Step 730. On the other hand, if there are no more attributes 803 to process (Step 745; NO), server 130 may end the segmentation process and proceed to Step 325 of the initiative analysis process of FIG. 3 (Step 790).

If segmentation engine 137 is directed or configured to perform segmented processing on the attributes (Step 720; SEGMENTED), an initial attribute 803 is selected for processing (Step 760). Segmentation engine 137 may split the test site performance metric results into fragments that represent sets of test sites that are divided based on the statistical rank of their values for the selected attribute (Step 765). In addition, segmentation engine 137 may split the control group sites into fragments based on their values for the same selected attribute (Step 770). Segmentation engine 137 may then analyze each test site fragment against a corresponding control group fragment (Step 775). The results of the analysis are processed into segmented attribute fragment results that reflect the differences in the performance metric values for the test sites and corresponding control group sites for the selected attribute (Step 777). To better understand this segmented analysis, FIG. 10 shows a block diagram of an exemplary segmented attribute fragment comparison process consistent with certain aspects related to the present invention.

As shown, memory 137 may store a set of control group fragment information 1010-1040 and a set of test site fragments 1050-1080 for a particular attribute under analysis. During a segmented process operation, segmentation engine 137 may compare corresponding fragments from each set to generate segmented attribute fragment information 1090-1096. For example, control group fragment 1010 may be analyzed against test site fragment 1050 to produce segmented attribute fragment 1090, while control group fragment 1020 is analyzed against test fragment 1060 to produce segmented attribute fragment 1092. The segmented attribute fragment information 1090-1096 is stored in memory 137 for subsequent processing. Accordingly, at Step 775 of FIG. 7, segmentation engine 137 generates and stores the segmented attribute fragment results in a memory device, such as memory 136 or database 140.

Also, segmentation engine 137 may determine a correlation value and a 1-p value in a manner similar to that described above in connection with Step 740 and FIG. 9. That is, segmentation engine 137 may determine a correlation and 1-p values that represent the strength of the relationship between the performance of the test sites (i.e., performance metric) and the selected attribute. The correlation values, 1-p values, and associated information may be stored in memory 136 or database 140.

If there are more attributes 803 to process (Step 780; YES), then segmentation engine 137 may select another attribute (Step 785) and the segmented process continues at Step 765. On the other hand, if there are no more attributes 803 to process (Step 780; NO), server 130 may end the segmentation process and proceed to Step 325 of the initiative analysis process of FIG. 3 (Step 790).

In addition to the processes performed during the segmentation process, server 130 may also generate pointers, software links, etc. between each attribute and its corresponding unsegmented and/or segmented attribute fragment information. Using these links, server 130 may generate content and data that allows the user to receive, view, and analyze the results of the segmentation processes (Step 325). For example, FIG. 11 shows an exemplary screen shot of an attribute table 1100 generated by server 130 consistent with aspects of the present invention. Table 1100 may be produced by server 130 using the attribute information generated during the segmentation process performed in Step 320 of FIG. 3. A user may request to view the attribute information by instructing server 130, via client 118, using queries, hyperlinks, and any other form of request technique through the browser software executing at client 118.

As shown, attribute table 1100 may include a list of all of the attributes 1110 associated with the test sites that have implemented the proposed initiative. These attributes may correspond to attributes 803 described above in connection with FIG. 8. Further, table 1100 may include a strength value 1120 representing a strength of the relationship between each attribute and the performance metric value on the test sites. As shown, attributes 1110 are ranked based on their corresponding strength values (e.g., R-squared values). Additionally, table 1100 may include correlation values 1130, and 1-p values for each attribute. These values may reflect the correlation values, 1-p values and information determined in Steps 730 and/or 775 of FIG. 7. As shown in FIG. 11, server 130 may determine and present correlation values for the test sites and control group sites.

Figure 12:
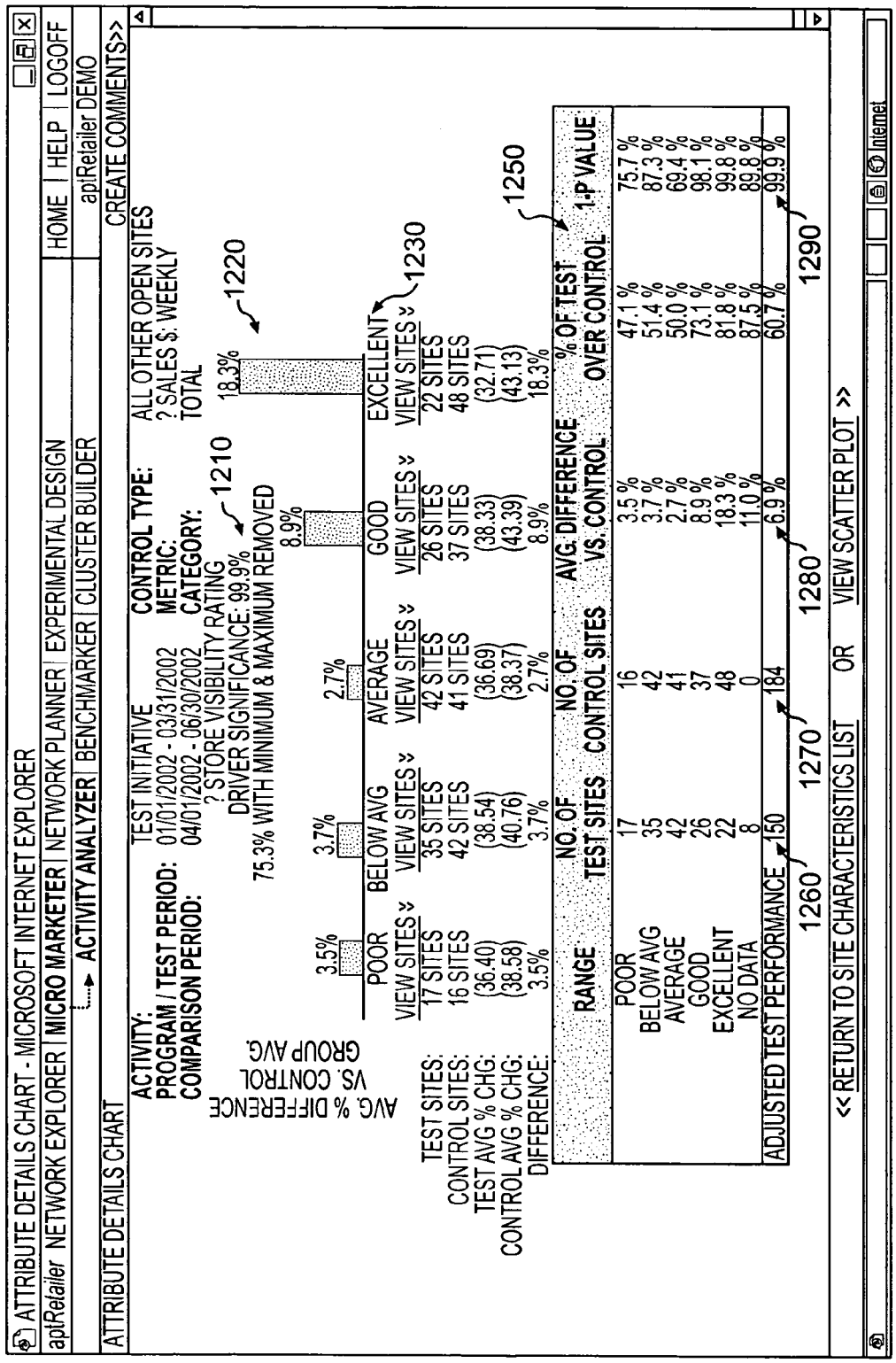
FIG. 12 shows a screen shot of an exemplary attribute details web page, consistent with certain aspects of the present invention.

In another aspect of the invention, the attributes 1110 listed in table 1100 may be active in that the user may select an attribute (e.g., click) using an input device to view additional information regarding the attribute selected. FIG. 12 shows a screen shot of an exemplary attribute details page associated with segmented attribute quartile results for a selected attribute 1210. In one aspect, the details page may include information representing the fragments generated by segmentation engine 137. For example, the details page may include a graph having segmented fragments 1220 for attribute 1210. On the X-axis of the graph may be the attribute information 1240 and the Y-axis is the performance metric values 1230, determined in this example in segmented form. Further, the details page may include a chart 1250 having information associated with the segmented attribute fragment data reflected in the graph. This information may include data reflecting the number of test sites 1260 and control group sites 1270 in each fragment, the computed performance metric data 1280, and a 1-p value 1290 reflecting a measure of likelihood that the relationship between the attribute and the performance metric values is not random. Segmentation engine 137 may calculate this value using statistical algorithms and/or processes based on the information provided by the segmented attribute fragment results.

Additionally, or alternatively, server 130 may generate and render a scatter plot graph in which each test site is a data point in the graph, the X-axis is the value for the selected attribute and the Y-axis is the performance metric values. Server 130 may be configured to allow the user to select more than one attribute from attribute table 1100. In response to this selection, server 130 may process and generate attribute graphs (e.g., fragment-based, scatter plot-based, etc.) including information showing the relationship between the multiple attributes and their corresponding performance metric values for the test sites.

Referring back to FIG. 3A, once the user has analyzed the segmentation process output data (Step 325), server 130 allows the user to select a model type and provide associated parameters for the model to be used for analyzing the initiative performed in the test sites (Step 330). Server 130 is configured to execute the selected model using information related to the test sites to identify the attributes that are deemed most relevant to the success of certain test sites that implemented the initiative. Server 130 uses the test site information to train the selected model. Once the user, or a software program, determines that the model is predicting accurate performance metric data based on the actual initiative feedback data provided by the test sites, server 130 may apply the model to the control group sites.

Figure 13:
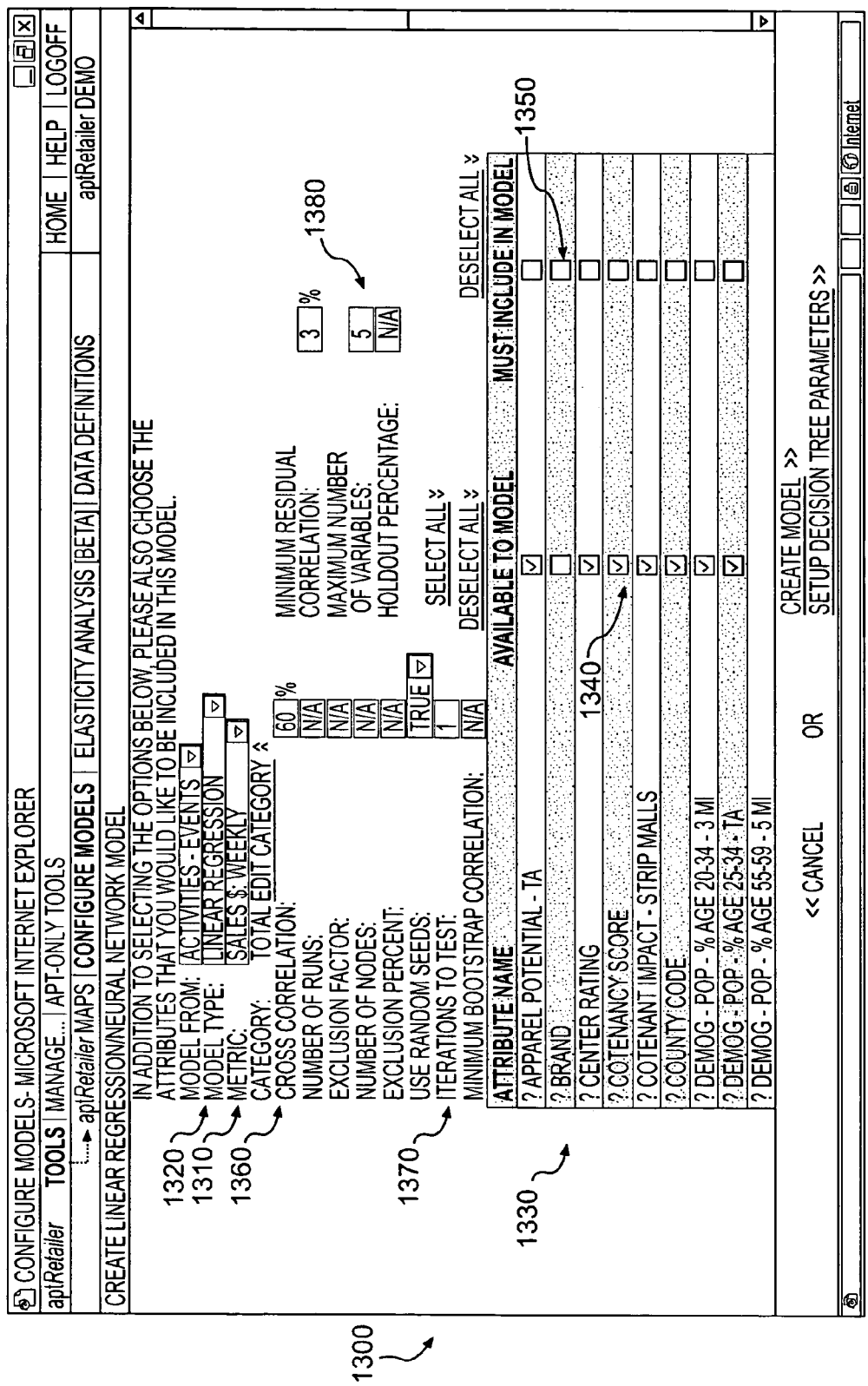
FIG. 13 shows a screen shot of an exemplary model selection web page, consistent with certain aspects of the present invention.

In one aspect of the invention, server 130 may offer different types of modeling methodologies that are used to predict performance values of the test and/or control group sites, such as linear regression, staged linear regression, neural network basic train, neural network stepwise regression, decision tree, K-means similar site modeling, and any other type of software model that may be used to analyze the information produced and/or collected by segmentation engine 137 and server 130 during the initiative analysis process. Server 130 may generate a web page that includes a list of modeling methodologies from which the user may select. Also, server 130 may allow the user to program a custom modeling methodology that may be used to analyze the initiative. Once the model is selected, server 130 may query the user for parameters and other type of information used by the selected model. FIG. 13 shows a screen shot of an exemplary model selection web page 1300 that includes menus for allowing the user to select a model and provide one or more parameters for the selected model.

As shown, web page 1300 allows the user to select the type of performance metric 1310 to run in the selected model 1320. Further, server 130 may allow the user to select which attributes 1330 are available for consideration by the selected model when executed. As shown in FIG. 13, the exemplary web page 1300 may allow the user to select/deselect an attribute 1330 using corresponding selection boxes 1340 and 1350 to indicate that the particular attribute is to be used by the selected model. Also, the user may provide parameter information, such as selecting the maximum number of attributes 1380 the model should use when completing its analysis of the test sites and the implemented initiative. For example, the user may instruct server 130 to consider only a certain number of the attributes with the strongest relationship to performance (e.g., the ten most important attributes) from among the entire list of attributes 1330. The user may force the model to include a particular attribute by selecting parameter box 1350 for that particular attribute. In this instance, server 130 always considers and uses the attributes selected via parameter 1350 when predicting performance values of the test sites.

Further, the user may also direct server 130 to consider cross correlations 1360 between attributes when executing the selected model. Cross correlation is a parameter that reflects the similarity between attributes and their affect on the selected model's results. For example, two or more of the selected attributes 1330 may be closely related, such as an attribute for the number of competitive business locations within a five mile radius and another attribute for the number of competitive business locations within a ten mile radius. These two exemplary attributes may affect the model in a similar fashion. The user may not want such similar attributes considered in the selected model. Accordingly, by setting the cross correlation parameter 1360, the user directs server 130 to remove one of the similar attributes (leaving one attribute) from consideration by the selected model. This enables server 130 to consider independent attributes when executing the selected model. Also, the user may select the number of iterations 1370 the model should run when training itself for producing its results.

Once the model and associated parameters are selected, server 130 may execute the selected model (Step 335). In one aspect, server 130 may leverage model processing engine 138 to process the model. In such an instance, server 130 provides the user's selections and parameters to engine 138 for subsequent processing. Further, model processing engine 138 may re-execute the model based on the number of iterations 1370 selected by user in Step 330. In this regard, engine 138 tests and trains the model to calibrate its results. For example, model processing engine 138 may build a model using a subset of the test sites (e.g., 20 out of 30 test sites) and tests the results of the model on the remaining test sites (e.g., the remaining 10 test sites). The model may compute predicted performance metrics for each of the remaining test sites based on the attributes selected by the model and compares them to the actual performance metrics of the remaining test sites. Server 130 may repeat this process for the number of iterations set by the user in Step 330.

Figure 14:
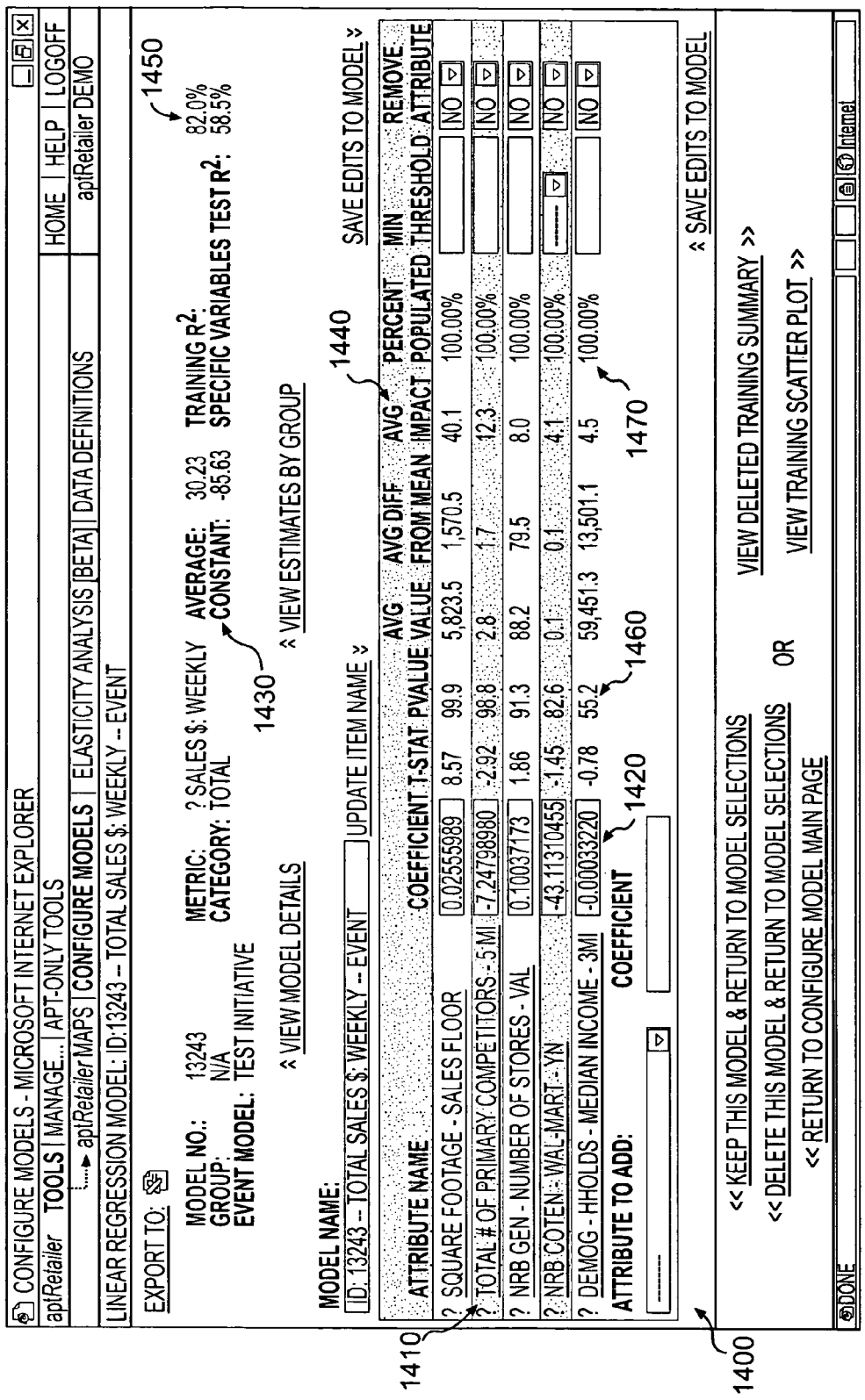
FIG. 14 shows a screen shot of an exemplary model results web page, consistent with certain aspects of the present invention.

Once the model is executed, server 130 may generate and render the results to the user, via client 110. The user may then analyze the results of the executed model (Step 340). In one aspect, server 130 may generate a model results web page that includes information pertaining to the results of the executed model. FIG. 14 shows a screen shot of an exemplary model results web page 1400 consistent with certain aspects of the present invention. As shown, model results web page 1400 includes details of the attributes selected by the model. For example, web page 1400 may include a list of attributes 1410 used by the model. For each of these attributes, and based on the type of model selected by the user, server 130 may also provide details regarding the variables, constants, and other data used by the selected model. For example, results web page 1400 shows the results for a selected linear regression model. In this example, server 130 may provide the values for a linear least squares fitting algorithm used to find the best fitting line through a set of points. This algorithm may include a constant and co-efficient that are assigned to each attribute. Accordingly, server 130 may provide the co-efficient values 1420 assigned to each attribute used by the model. Further, the constant 1430 used by the model for this type of model algorithm may be included in results web page 1400. Additionally, server 130 may provide information showing the average impact 1440 of each attribute on the model results.

Moreover, server 130 may provide information showing how accurate the model predicts performance values of the test sites based on the selected parameters and the initiative. In one aspect, server 130 may provide quantitative measures reflecting the fitness of the model for predicting and analyzing the performance values of the test sites. For example, server 130 may provide an R-squared value 1450 reflecting a quantitative value of the model's fitness for predicting the success of the initiative in the control group sites. Alternatively, server 130 may express the fitness value as an error rate percentage value reflecting whether the predicted performance values are within a certain range of actual performance values associated with the test sites.

Additionally, server 130 may provide confidence measurements 1460 reflecting quantitative values of how well each attribute is actually contributing to producing a model that will successfully predict the performance metrics of the control group sites when implementing the initiative. Also, server 130 may determine and provide a percent populated value 1470 for each attribute 1410 that represents the percentage of test sites that server 130 has information for that particular attribute.

Figure 15:
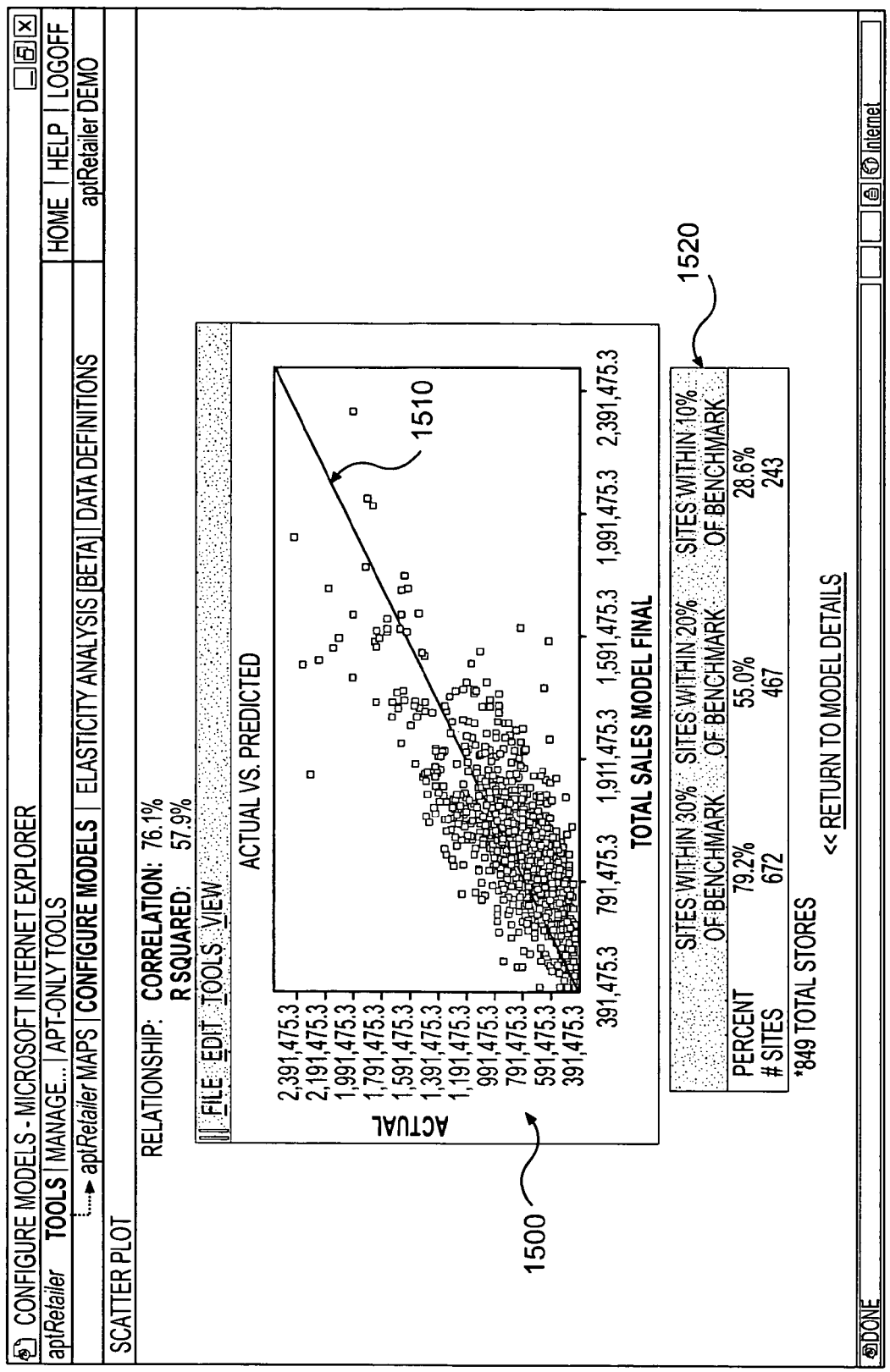
FIG. 15 shows a screen shot of an exemplary model results graph web page, consistent with certain aspects of the present invention.

In another aspect of the invention, model processing engine 138 may generate a graph showing the results of the executed model. FIG. 15 shows an exemplary model results graph 1500 page showing the results of the linear regression model explained above with respect to FIG. 14. The Y-axis of graph 1500 represents the actual performance metric values for each of the test sites and the X-axis represents the predicted performance metric values for the same test sites. Line 1510 represents a match between predicted performance metric values and actual performance metric values. The model processing engine 138 may determine the number of test sites are within certain ranges of a predetermined benchmark value. This information may be reflected as table 1520 that includes information showing the percentage and number of test sites within various percentages of the benchmark.

The user of business management unit 116 uses information reflected in graph 1500 and/or model results web page 1400 to determine whether the selected model and/or attributes are acceptable (Step 345). Alternatively, a software program executed by server 130 may analyze the information produced by the executed model to determine whether the model and/or attributes considered by the model are acceptable based on predetermined rules. Various factors may be considered by the user, or software program, when determining whether the model and/or attributes are acceptable. For example, a user may determine that one of the attributes 1410 considered by the selected model was not an appropriate attribute based on the percent populated value 1440 for that attribute. Alternatively, or additionally, the confidence measurement 1460 for an attribute may cause the user or the software program to determine that that attribute is not acceptable for consideration by the model. On a broader scale, the user or software program may determine that the selected model is not appropriate for predicting performance metrics for the non-test sites based on the confidence measurement for that model (e.g., r-squared value 1450). The above exemplary factors are not intended to be limiting and the user and/or software program may use other result information to determine the appropriateness of the selected model and/or attributes.

If the results are not acceptable (Step 345; NO), the user and/or, software program may re-select a model, attributes, and/or parameters for analyzing the initiative (e.g., return to Step 330). For example, the user may remove one or more attributes from consideration prior to re-execution of the selected model. If, however, the results are acceptable (Step 345; YES), the user and/or software program may direct server 130 to apply the model to the non-test group sites to determine a predicted impact of the initiative on these sites (Step 350). The server 130 may do this by applying attributes 1410 and their corresponding coefficients 1420 selected by the model in step 335 to each non-test site's values for those attributes 1410. In doing so, server 130 calculates the predicted performance of the initiative on each non-test site based on that site's relevant attributes 1410.

Once server 130 applies the tested model to the non-test group sites and the test sites, a determination may be made as to those sites having the highest or more acceptable predicted performance metric values. Server 130 may rank the sites accordingly and provide this information to the user via client 118. FIG. 16 shows a business location analysis table that includes exemplary results from applying the model to the control group sites. As shown, FIG. 16 shows a list of business locations (e.g., control group and test sites) 1610 that are ranked based on each site's predicted performance metric values 1620. In other words, using the sales lift performance metric as an example, server 130 may place those sites that have an estimated larger sales lift when implementing the initiative higher in the list of sites 1610 than those who have lower estimated sale values. Further, server 130 may provide information showing the actual performance metric values 1630 for those test sites that implemented the initiative and provided actual feedback information to server 130. Based on the exemplary results depicted in FIG. 16, the user may select one or more of the non-test sites to implement the initiative. Accordingly, the user analyzes the information provided by model processing engine 138 and server 130 to make an informed decision on which sites to implement the initiative tested at the test sites. Along the same lines, the user may also select those sites that should not implement the proposed initiative.

In another aspect of the invention, server 130 may provide results of the processed model based on any grouping of the sites. One such example of a group of sites are regions 112-1 to 112-N explained above in connection with FIG. 1. FIG. 17 shows a table that includes exemplary results from applying the model to the non-test group sites in a region format For example, FIG. 17 shows an exemplary table listing the regions 1710 having those business locations (e.g., control group sites and/or test sites) 1720 and their associated predicted performance metric values 1730 and actual performance metric values 1740 (if applicable). As with the table depicted in FIG. 16, server 130 may rank the regions 1710 accordingly to their predicted performance metric values. Thus, those regions having business locations with corresponding high estimated performance metric values are ranked above those regions with lower or less attractive performance metric values. Accordingly, instead of selecting individual business locations for implementing the initiatives, the user may determine which regions to apply the proposed initiative based on the information provided by server 130 in this format.

IV. ADDITIONAL EMBODIMENTS

As described, methods and systems consistent with certain aspects of the present invention utilize a software model that is used for analyzing initiatives to be applied in test sites (e.g., business locations). In one aspect, server 130 may configure the model based one on or more selected parameters that control the manner in which the model processes data and measures the performance values of test sites. In one aspect, performance may be measured as a change in relevant performance values for the test sites from before the start of an initiative to during or after the initiative starts, relative to the change in performance in a control group over the same time period. For example, the parameters may include data reflecting whether the model should consider changes in absolute sales or in comparable ("comp") (e.g., year over year) sales, the manner by which the model selects a control site group (e.g., sites not included in a selected set of test sites, for example, balance of market, comparable market, etc.), whether or not the model should filter outliers, the process used by the model to filter outliers, identifying the test measurement period, etc.

Certain aspects of the present invention enable server 130 to identify and set those model parameters that will best filter out noise associated with date related to the stores where the initiative was applied in order to produce more accurate results regarding the impact of the initiative. Noise may be a quantified measurement of inconsistent performance data for sites used in the analysis performed by the model. Aspects of the present invention create a simulation environment where the model performs a number of virtual initiative tests (e.g., initiative tests that have not actually been implemented in a business location) using different parameters. Based on the results of the virtual tests, server 130 may identify parameter settings that best filter noise from the results. Those parameter settings are then automatically selected for a particular test type as default settings that are subsequently used in performing actual initiative tests for predicting the performance of selected business locations based on the proposed initiative.

a. Overview of Determining Parameter Settings

Figure 18:
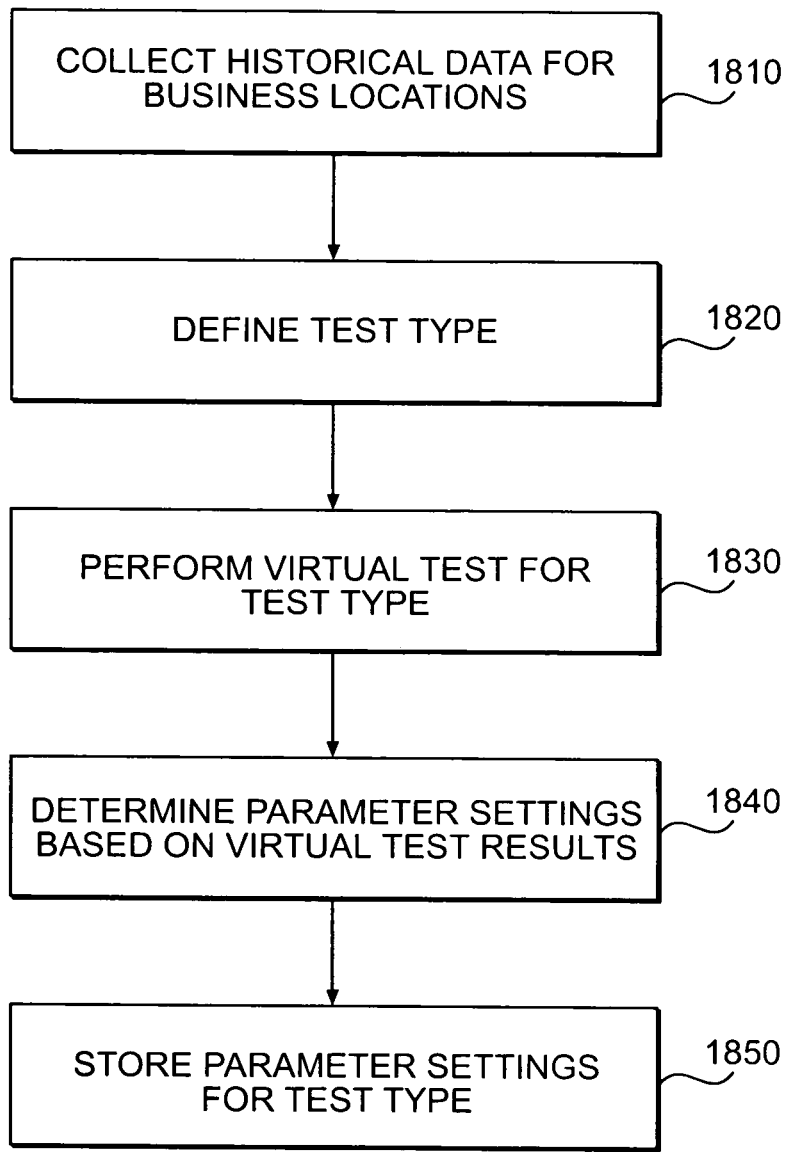
FIG. 18 shows a flow chart of an exemplary parameter setting process, consistent with certain aspects of the present invention.

FIG. 18 shows a flowchart of an exemplary parameter setting process consistent with certain aspects related to the present invention. In one aspect, server 130 may execute software that performs the parameter setting process. Initially, server 130 may collect historical data for business locations 114 within business network 110 (Step 1810). The historical data may include performance data associated with performance metrics, such as sales information, foot traffic, etc. The historical data may have been previously retrieved by server 130 from business locations 114 via client 118 and stored in database 140. Accordingly, server 130 may collect the historical data from database 140 during step 1810, although other methods of collecting the historical data may be implemented by aspects of the present invention.

Server, 130 may also define a test type that is associated with the business initiative testing model having a set of parameter settings (Step 1820). A test type may be a type of business initiative testing model that server 130 executes when running actual initiative tests to predict the performance of certain test sites, in a manner similar to the above disclosed aspects of the present invention. For example, a test type may be defined based on a particular characteristic of the initiative test, such as the length of a test period for the initiative test, etc. For purposes of illustrating aspects of the present invention, server 130 may define the test type based on a selected test period. It should be noted that any other attribute of a test may be used to define a test type. Server 130 may receive input from a user defining the test type or, alternatively, may automatically define the test type.

Once the test type if defined, server 130 may perform a virtual test on the defined test type (Step 1830). A virtual test reflects a mock initiative test that is performed on a selected number of test sites based on defined configuration settings for the model executed by server 130. The virtual test is considered a mock initiative test because no actual initiative test is planned or has been implemented in any virtual test sites (e.g., business locations identified for purposes of the virtual test). In this regard, server 130 creates a simulation environment for running virtual initiative tests for collecting information used for identifying the optimal default model parameters settings for the defined test type. Performing a virtual test may include configuring the virtual test such that server 130 iteratively performs a business initiative test for selected virtual test sites for each of a certain number of model parameter settings. Each model parameter setting may include one or more parameter setting options. Thus, for each iteration, server 130 may determine a noise value for each combination of available parameter settings and options and stores the values in a memory device for subsequent processing.

Server 130 may compare the noise values for each parameter setting combination to determine the parameter settings for the defined test type (Step 1840). In one aspect, server 130 may perform a statistical process on the noise values for each parameter setting combination, such as determining an average noise value for each combination over the iterations of collected noise values. In another aspect, server 130 may determine the parameter settings by identifying a parameter setting combination that produced the least amount of noise during the virtual test. Server 130 may identify this optimal parameter setting combination as a set of parameters settings that are to be used to configure the defined test type when executed for performing actual initiative tests to predict the performance of selected test sites. As such, server 130 may store the parameter settings for the defined test type in memory for subsequent use by the model (Step 1850). These and other aspects of the parameter setting process are described in further detail below in connection with FIGS. 19-26.

b. Performing a Virtual Test

Figure 19:
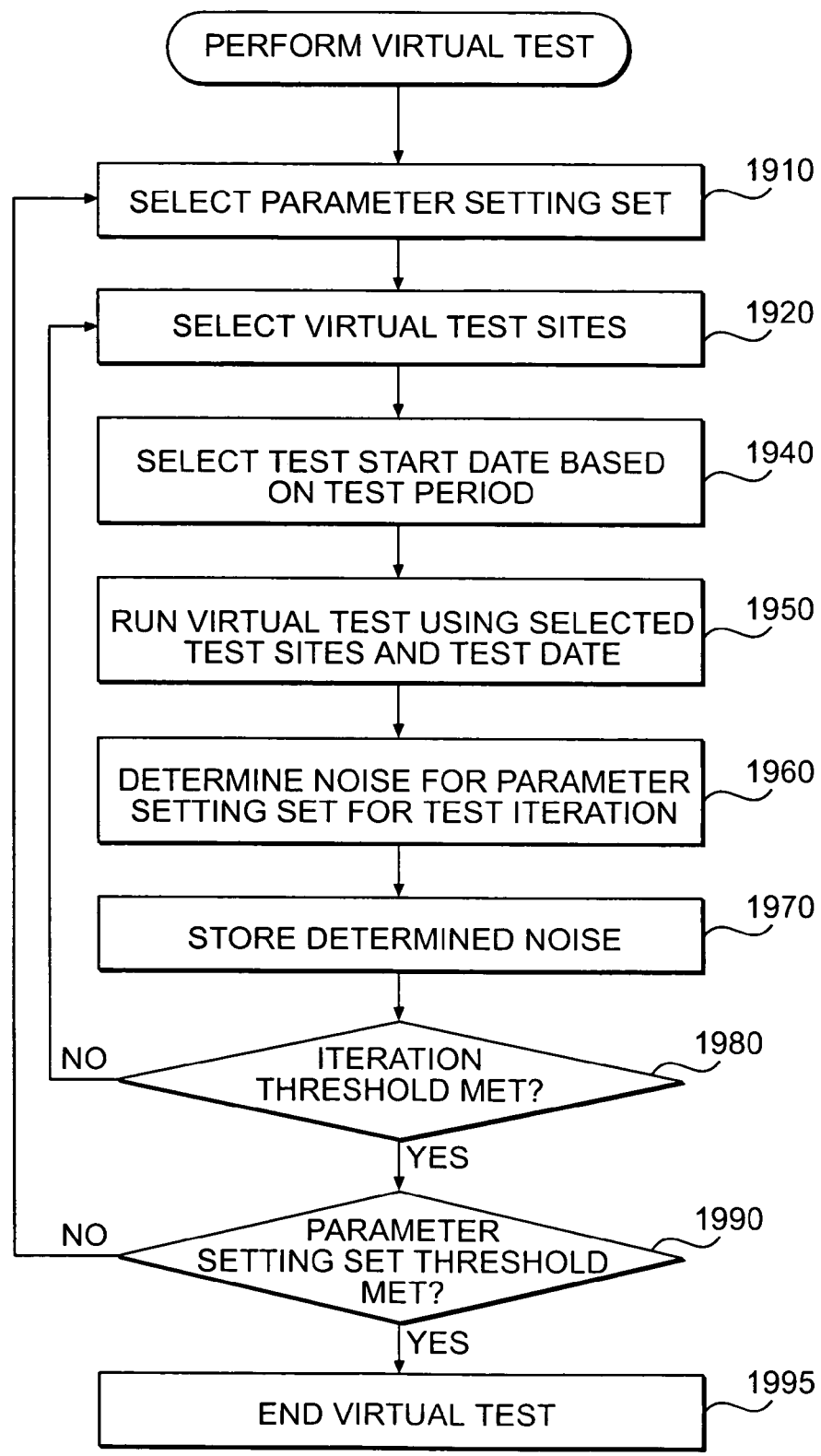
FIG. 19 shows a flow chart of an exemplary virtual test process, consistent with certain aspects of the present invention.

FIG. 19 shows a flowchart of an exemplary virtual test process that may be performed by server 130 consistent with certain aspects of the present invention. When performing a virtual test, server 130 may first select a parameter setting set (Step 1910). To do so, in one aspect, server 130 may execute a process that first determines the number of parameter settings and parameter setting options for the type of model that will perform the initiative tests. As describe above, server 130 may execute a number of different models that are used for performing an initiative test. Each model may have a certain number of parameter settings and each parameter setting may include one or more parameter setting options. For example, a model may include a control group selection parameter setting that may define different methods for selecting a control group. One method may include selecting all business locations (i.e., sites) not included in a virtual test site set to be included in the control group for the virtual test performed by server 130 (e.g., balance of chain process). Alternatively, the control group may be selected based on a balance of market or other geographic region-related data, or based on a determined similarity to the virtual test sites (e.g., size, customer base profiles, sales, etc.), etc. Each of these exemplary control group selection methods may be a parameter setting option for the control group selection parameter setting.

Other types of parameter settings include a parameter that controls whether the model will use algorithms to filter outliers (e.g., performance data for a virtual test site that is too inconsistent with other related performance data). Thus, one option of this type of parameter setting may be to use outlier data, and another option may be to disregard outlier data. Other outlier parameter setting options may include the type of algorithm implemented when disregarding outlier data. For example, one option may be to remove the determined performance data entirely from the set of data used by the model. Another option may be to use a capped algorithm that changes the data of an outlier result to make the result no longer an outlier. For instance, if an outlier is defined as an observation (e.g., data result) that is more than three standard deviations from a mean, the capped algorithm may overwrite a outlier that is four standard deviations from the mean with a value that represents three standard deviations from the mean.

Another type of parameter setting may include whether the model will view changes in absolute performance data (e.g., actual sales data) or comp performance data (e.g., year to year sales data). For example, in measuring actual sales, a test site may have been selling $300 per day before an initiative was implemented. Following implementation, the test site may be selling $330 per day. Accordingly, the test site experienced a 10% lift in absolute sales. Comp sales, on the other hand, measures change in year on year sales. For example, a test site may have been selling 5% higher than in the prior year before an initiative was implemented. Following implementation, the test site may be selling 8% higher than in the prior year. Accordingly, the test site experienced a roughly 3% increase in comp sales.

A model may also have a parameter setting that defines how long of a pre-period to implement in the initiative tests run by the model. A pre-period may be a length of time prior to a selected test start date for a virtual test for which the model will measure performance before the initiative was implemented. In the above example, a test site was selling $300 per day before the initiative was implemented and $330 per day after the initiative was implemented. The $300 in sales per day represents performance in the pre-period. This exemplary parameter setting determines what length of time to use in measuring pre-period performance. For example, if a model is configured to compare performance data for a selected test period following a test start date (e.g., Sep. 1, 2004), a one month selected pre-period may be reflect the time period including all of August, 2004. Similarly, a one year pre-period may include the time period including the beginning of September 2003 to the end of August 2004. Any length of pre-period may be selected in accordance with certain aspects related to the present invention.

The above exemplary parameter settings and parameter setting options are not intended to be limiting. Server 130 may define any type of parameter setting and parameter setting options for any type of model, based on the characteristics of the model.

Once the number parameter settings and parameter setting options are selected, server 130 may determine the maximum number of parameter setting combinations that may be tested using the model. For example, for an exemplary set of parameters including four parameter settings, and each parameter setting having four respective parameter setting options, server 130 may determine there are 256 possible parameter setting combinations available for the model to test (e.g., {P1(1), P2(1), P3(1), P4(1)} . . . {P1(4), P2(4), P3(4), P4(4)}).

Thus, in selecting a parameter setting set, server 130 may set a value, PS(Max), to 256 representing the maximum number of combinations for the test type. Further, server 130 may then select a first parameter setting set reflecting a selected combination of parameter settings including one option from each available parameter setting. For instance, server 130 may select the first option from each of the four exemplary parameter settings mentioned in the above example (e.g., Parameter Setting Set (PS)={PS1(1), PS2(1), PS3(1), PS4(1)}). Server 130 may select any combination during step 1910. As explained later, however, server 130 may be configured to select a different parameter setting set for each iteration of the virtual test.

Server 130 may also select a number of virtual test sites for the virtual test (Step 1920). In one aspect, server 130 may randomly select a certain number of virtual test sites from the available sites reflecting business locations 114 in business network 110. For example, server 130 may select fifty (50) virtual test sites from an available pool of one thousand (1000) sites in business network 110.

Based on the selected test period associated with the defined test type (e.g., one month), server 130 may select a test start date (Step 1940). The test start date may be a previous date that is already included in the monitoring periods associated with the historical data collected for the business locations 114 (i.e., sites) in business network 110. For example, if database 140 maintains historical data up to Dec. 31, 2004, server 130 may randomly select a start date that is before that date. The test start date may be further bounded based on the selected test period. Thus, for a one month test period, server 130 may be configured to select a test start date that is no later than Nov. 30, 2004 to allow for the test period to include the historical data for Dec. 31, 2004. Similarly, for a six month test period, server 130 may be configured to select the test start date no later than Jun. 30, 2004. Within these boundaries, server 130 may randomly select the test start date. Alternatively, server 130 may receive user input identifying the test start date.

In another aspect of the invention, server 130 may select a pre-period associated with the test period. A pre-period is a selected period of time extending back from the test start date. For example, server 130 may select a pre-period of one month. Thus, if Sep. 1, 2004 is selected as the test start date, the one-month pre-period would include Aug. 1, 2004 through Aug. 31, 2004. The pre-period may be equal to, or different from, the selected test period for the defined test type. Also, the pre-period may be selected based on the type of parameter settings and corresponding parameter setting options selected in step 1910. That is, if the test type includes a parameter setting option for determining how to select the pre-period, server 130 selects the pre-period according to that selected parameter setting option.

Also, based on the selected parameter settings, server 130 may determine a control site group for the virtual test, reflecting a selected set of sites (i.e., business locations 114) within business network 110. For example, a control group selection parameter setting option may direct server 130 to select the control group from the remaining sites in business network 110 that are not included in the set of selected virtual test sites.

Thus, server 130 may select the remaining 950 sites in the exemplary 1000 sites of business network 110 that were not chosen for the 50 virtual test sites. As noted above, a control group parameter setting may configure server 130 to select the control group based on different criteria, and thus the above examples are not intended to be limiting.

Once the parameter setting set, virtual test sites, and test start date are determined, server 130 may execute the model to run a virtual test. The model may execute an initiative test based on the configuration information and produce a result for a selected performance metric (Step 1950). For instance, if the model is configured to monitor sales data, server 130 may execute a process to collect sales data for the selected virtual test sites for the selected pre-period and test period. Thus, following the above examples, server 130 may collect and analyze the historical data to determine the sales data for the fifty virtual test sites during August 2004 and September 2004. Additionally, server 130 may collect and analyze the historical data for the control group to determine the sales data for the sites within that group (e.g., 950 sites). As noted above, server 130 may produce different types of result data based on the type of performance metric being monitored by server 130 when performing the virtual test.

Once the performance data (e.g., sales data) is determined, server 130 may determine the noise for the parameter setting set selected in step 1910 (e.g., (PS)={PS1(1), PS2(1), PS3(1), PS4(1)}) (Step 1960). As explained, noise may be represented as a value reflecting an inconsistency in the performance data for the virtual test sites in relation to the control site group. Thus, when the performance data for the virtual test sites vary from the performance data for the control group sites, server 130 may calculate a value reflecting this difference. Because the server 130 has created a simulation environment by performing the virtual test on the virtual test sites, no actual initiative was performed in these test sites. Accordingly, the performance data for the virtual test sites determined during the virtual test should be similar, if not identical to, the performance data for the control group. For instance, server 130 may determine during the virtual test that the control group experienced a 2.5% sales lift from August 2004 to September 2004 (e.g., performance metric result data for the pre-period vs. the performance metric result data for the test period). Server 130 may also determine that the virtual test sites experienced a 3% sales lift during the same time frame. This difference (i.e., 0.5% lift) may be the result of a difference in the sales trends between the test set and control group. Accordingly, server 130 may identify the difference as a quantified value of noise. Server 130 may then store the determined noise for the selected parameter setting set in a data structure maintained in a memory device, such as database 140 (Step 1970).

According to certain aspects of the invention, server 130 may be configured to iteratively run a virtual test for the selected parameter setting for a predetermined number of times. Accordingly, server 130 may define a iteration threshold that controls how many times the selected parameter setting set is tested (e.g., 10 times, 100 times, etc.). The iteration threshold value may be determined at any time before checking the threshold, such as when the test type is defined (e.g., step 1820), when selecting the parameter setting set (step 1910), etc. Therefore, as server 130 performs a virtual test for a selected parameter setting set, it may track the number of times it has run a virtual test on the set. As such, in step 1980, server 130 determines whether the iteration threshold has been met. If so (Step 1980; Yes), the virtual test process continues to Step 1990. However, if the iteration threshold is not met (Step 1980; No), server 130 may return to step 1920 to select a new set of virtual test sites and new test date to run another virtual test for determining a new noise value for the selected parameter setting set. The new noise value for the current iteration is also stored in the data structure. This process continues until the iteration threshold is met (e.g., the selected parameter setting is tested 100 times).

Once the iteration threshold is met, server 130 may determine whether all combinations of the parameter settings have been iteratively tested. In one aspect, server 130 may determine whether a parameter setting set threshold is met, which may be set equal to PS(Max) previously determined by server 130 (Step 1990). If the threshold is met (Step 1990; Yes), the virtual test process ends (Step 1995). On the other hand, if the parameter setting set threshold is not met (Step 1990; No), server 130 selects a new parameter setting set from the available combinations previously determined, and repeats the iterative testing processes described above. In this regard, server 130 ensures each combination of parameter settings based on their corresponding options have been iteratively tested, and a noise value determined and stored in the data structure.

c. Determining Noise

Figure 20:
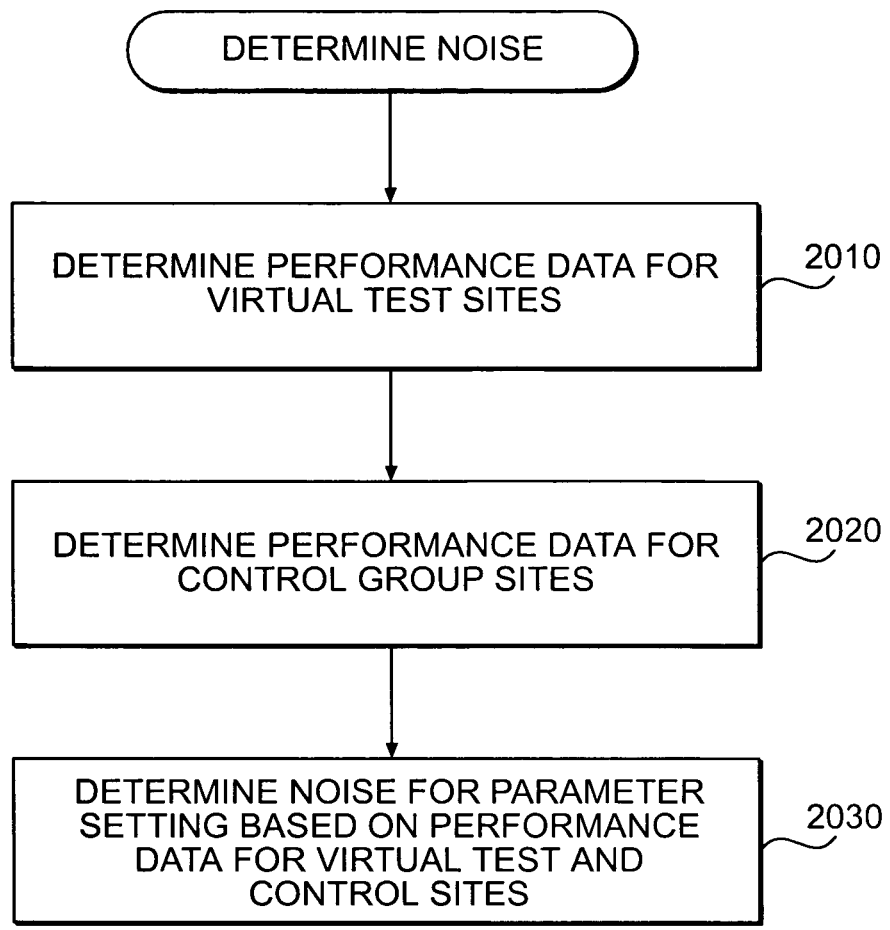
FIG. 20 shows a flow chart of an exemplary noise determination process, consistent with certain aspects of the present invention.

As explained, server 130 may execute a software process that determines noise for each iteration of a virtual test of a selected parameter setting set. Noise reflects a quantified measurement of inconsistent performance data for sites used in the analysis performed by a business initiative testing model. FIG. 20 shows a flowchart of an exemplary noise determination process consistent with certain aspects related to the present invention.

In step 2010, server 130 may determine the performance data for the virtual test during the pre-period and test period. In one aspect, server 130 may access database 140 to collect the historical data for each virtual test site to determine, based on the selected performance metric, the performance data during each time period. Server 130 may average the determined performance data for the virtual test sites, or determine other statistical values associated with the determined performance data. Similarly, server 130 also determines the performance data for the control group sites during the pre-period and test period (Step 2020). Server 130 may then determine the noise for the selected parameter setting set based on a comparison of the performance data for the virtual test sites and control group sites (Step 2030).

Figure 21:
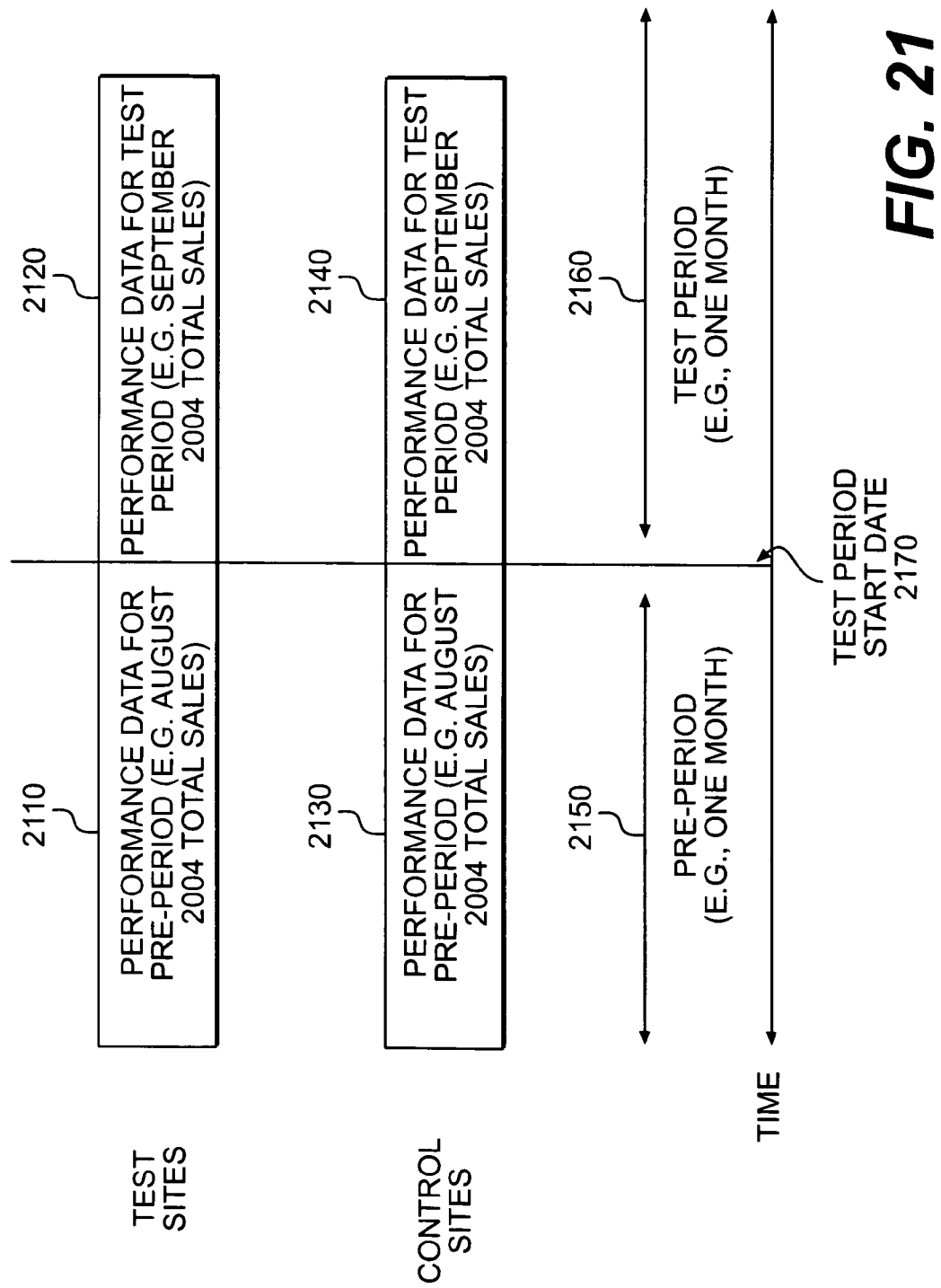
FIG. 21 shows a block diagram of exemplary performance data associated with a virtual test, consistent with certain aspects of the present invention.

To better understand these aspects of the present invention, FIG. 21 shows a block diagram of performance data associated with a virtual test having a test period 2160 and pre-period 2150 of one month, a test start date 2710 of Sep. 1, 2004, and a performance metric of total sales. As shown, server 130 may determine for the virtual test sites the performance data for a pre-period 2110 (e.g., August 2004) and a test period 2120 (e.g., September 2004). Server 130 may also determine, for the control group sites, the performance data for the pre-period 2130 and test period 2140. Server 130 may also determine a statistical value associated with the performance data of each period for both control sites and virtual test sites. For instance, based on a parameter setting controlling how server 130 looks at performance data during the virtual test, server 130 may determine that the absolute sales performance data for the virtual test sites shows a 3% lift from August 2004 to September 2004. On the other hand, server 130 may determine that the absolute sales performance data for the control group sites shows a 2.5% lift in the same time frame. Server 130 may quantify this difference as noise. Thus, based on the determined performance data, server 130 determines the noise value for the selected parameter setting set as roughly 0.5 (i.e., (1.03/1.025)−1). This noise value is stored in the data structure in accordance with the disclosed aspects of the present invention.

Although as described above, server 130 determines noise based on a difference of performance data, methods and systems consistent with certain aspects of the present invention are not limited to the above examples and may quantify noise based on other relationships between performance data of the test and control sites.

d. Determining Parameter Settings

Figure 22:
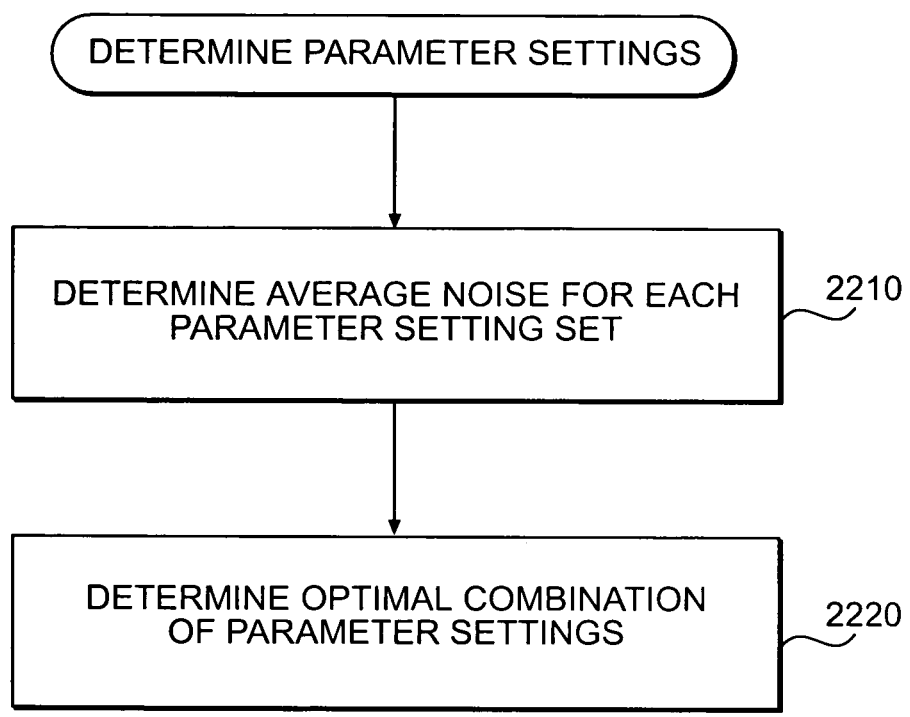
FIG. 22 shows a flow chart of an exemplary parameter setting determination process, consistent with certain aspects of the present invention.
Figure 23:
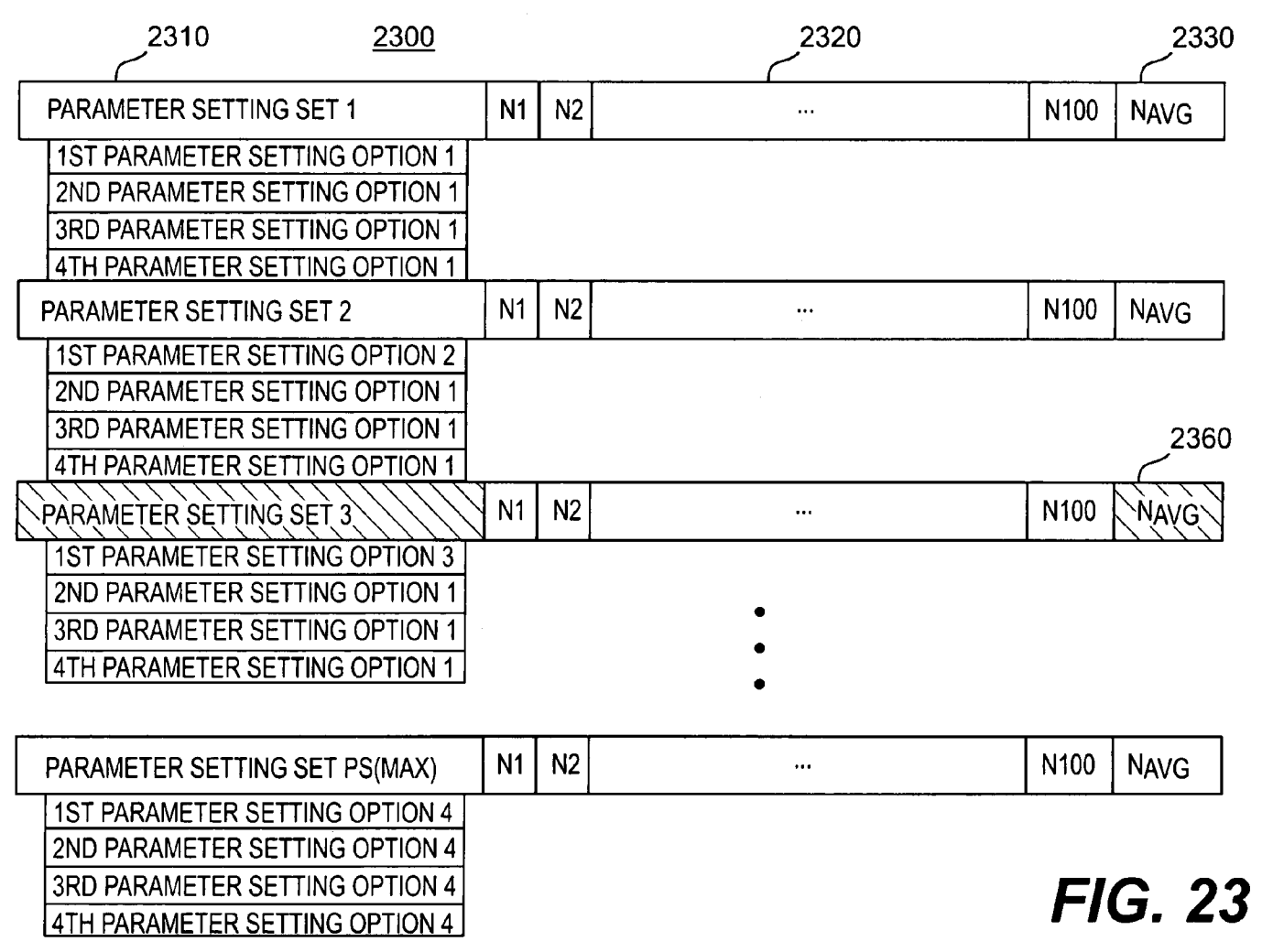

FIG. 22 shows a flowchart of an exemplary parameter setting process consistent with certain aspects of the present invention. In one aspect, once the noise values for each iterative test of each parameter setting set are determined and stored, server 130 may determine the average noise for each parameter setting set and store the average noise value in the data structure. (Step 2210). Thus, server 130 may maintain in database 140, for example, a data structure of noise values corresponding to each parameter setting set. FIG. 23 shows a block diagram of an exemplary data structure 2300 consistent with certain aspects of the present invention. In one example, data structure 2300 includes a field for each parameter setting set 2310 included in the available combinations of parameter setting sets (e.g., up to PS(Max)). As shown, each parameter setting set includes particular parameter setting set options for each parameter setting. Data structure 2300 shows exemplary parameter setting options for four parameter settings, each having four parameter setting options. Thus, parameter setting set 1 includes the set, {PS1(1), PS2(1), PS3(1), PS4(1)} and parameter setting set PS(MAX) includes the set {PS1(4), PS2(4), PS3(4), PS4(4)}. Further, each parameter setting set field 2310 includes a noise value 2320 for each virtual test iteration performed by server 130. In this example, data structure 2300 includes 100 noise values representing the determined noise for each of the 100 virtual test iterations performed by server 130 for a given parameter setting set. Additionally, server 130 may determine and store the average noise value 2330 for a given parameter setting set based on the iteration noise values 2320.

In another aspect of the present invention, server 130 may store noise values in a data structure based on each parameter setting option. FIG. 24 shows a block diagram of an exemplary data structure 2400 consistent with these aspects. As shown, exemplary data structure 2400 includes data associated with a four parameter setting combination, each parameter setting including four options. Data structure includes fields including data identifying each parameter setting option 2450 for a given parameter setting 2410-2440. Each parameter setting option 2450 is associated with fields including noise values 2460 determined by server 130 during different iterations of the virtual tests. In this example, data structure 2400 include 100 noise values reflecting the 100 times server 130 determined a noise value when the given parameter setting option was used during the virtual test (e.g., 1, 2, 3, or 4). For example, parameter setting option 1 of the first parameter setting 2410 includes noise values for 100 iterations of the virtual test when that option was used to configure the model performing the virtual test. Thus, when performing the virtual test process, server 130 may store a noise value in a successive field for parameter setting option 1, each time that option was tested. Server 130 may also determine and store the average noise 2470 for each parameter setting option 2450 of each parameter setting 2410-2440 in data structure 2400.

Aspects of the present invention are not limited to the configurations shown in FIGS. 23 and 24. Server 130 may configure and store noise values in any type of data structure and memory device. Further, aspects of the present invention are not limited to server 130 storing average noise values and/or parameter setting set noise values in the same data structure as the noise values. For example, data structures 2300 and/or 2400 may each represent a data structure formed from multiple data structures distributed across multiple memory devices.

Once the average noise value for each parameter setting is determined, server 130 may determine the optimal combination of parameter settings for the parameter settings (Step 2220). In one aspect, server 130 may identify the parameter setting set having the lowest average noise as the optimal parameter setting set. For example, server 130 may search the data structure storing the average noise values to identify the lowest values. Thus, for example, if a parameter setting set 3 of FIG. 23 includes the lowest average noise 2360, server 130 may designate parameter setting {PS1(3), PS2(1), PS3(1), PS4(1)} as the optimal parameter setting. In other words, server 130 will define the parameter settings for the given test type to include the third parameter setting option of parameter setting one, and the first parameter setting option of parameter settings two through four.

Figure 25:
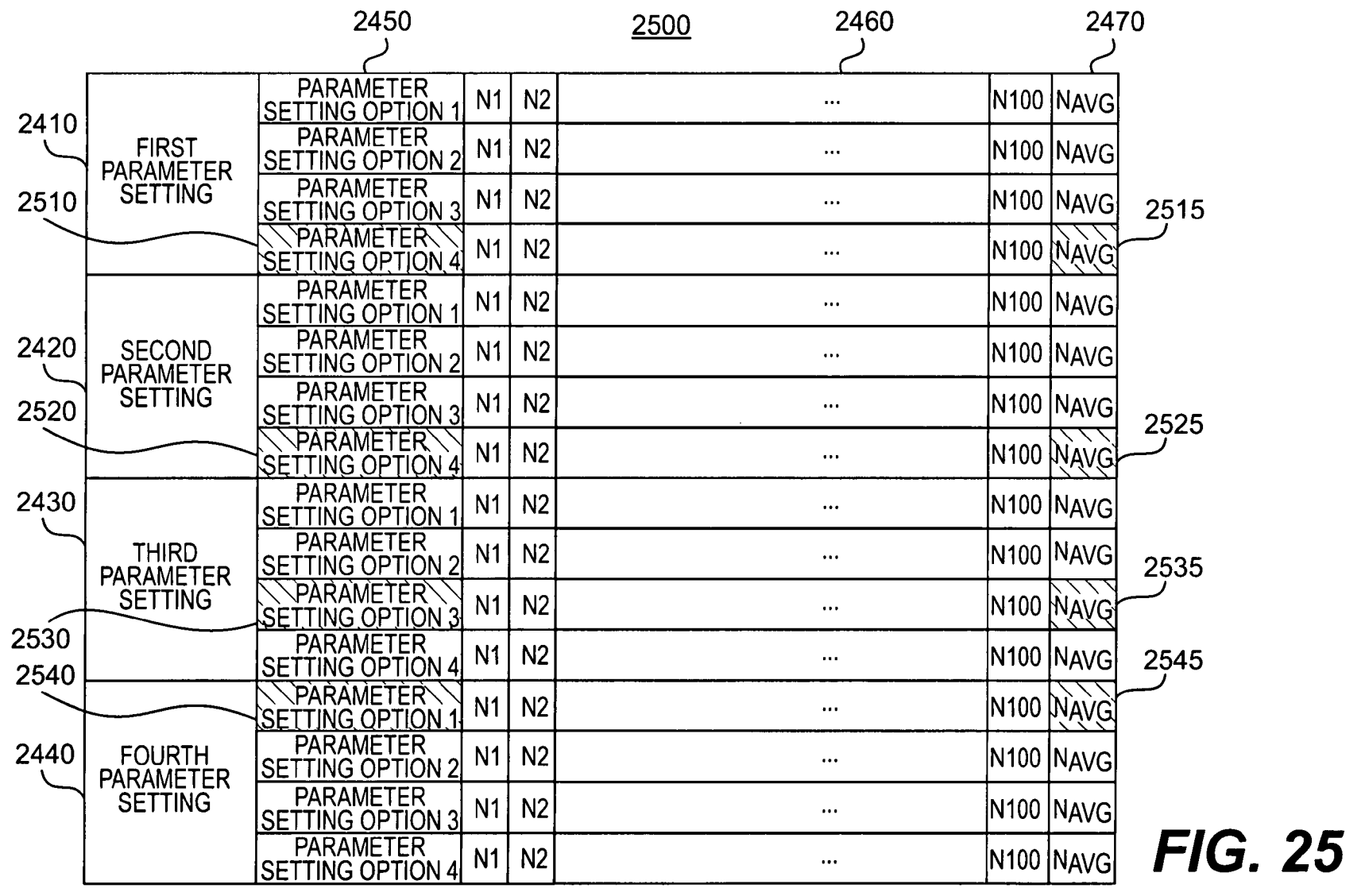

In another example corresponding to data structure 2400, server 130 may identify the lowest average noise value for each parameter setting option for each parameter setting, and then combine these lowest average noise values to form the optimal parameter settings to define the default settings. For example, FIG. 25 shows data structure 2400 identifying exemplary lowest average noise values 2515, 2525, 2535, and 2545 for respective parameter setting options 2510, 2520, 2530, and 2540. Accordingly, in this example, server 130 may form an optimal parameter setting set including, {PS1(4), PS2(4), PS3(3), PS4(1)}.

It should be noted, server 130 may be configured to execute programs that identify the lowest noise values for the parameter settings using different methods than that described above. As such, the above described processes are exemplary and not intended to be limiting.

e. Performing an Initiative Test Using Parameters

Figure 26:
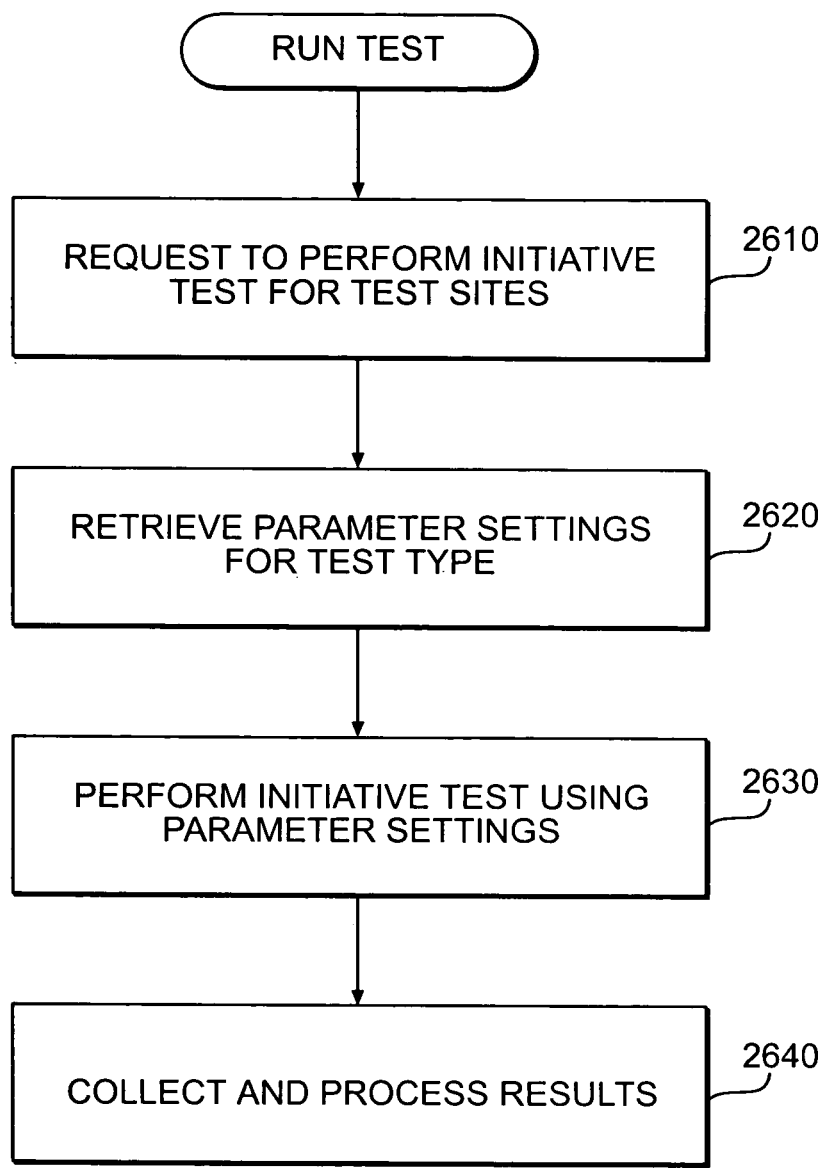
FIG. 26 shows a flow chart of an exemplary initiative testing process, consistent with certain aspects of the present invention.

In accordance with certain aspects of the present invention, once server 130 identifies the parameter settings for a given test type, the setting is stored in a memory device (e.g., database 140) for subsequent use by server 130 when running an initiative test for selected test sites. FIG. 26 shows a flowchart of an exemplary initiative test process consistent with these aspects of the invention. Initially, at some time, server 130 may receive a request to perform an initiative test for a selected set of test sites in a manner consistent with that described above and in parent U.S. patent application Ser. No. 10/767,191. Server 130 may retrieve parameter settings for the requested initiative test based on the type of test to be performed (Step 2620). In one aspect, server 130 may access database 140 to retrieve the parameter settings previously determined by running the virtual tests for that test type in accordance with the processes described above. Once retrieved, server 130 configures the initiative test in accordance with the parameter settings, and performs the test (Step 2630). Results may then be collected and processed by server 130 in a manner consistent with that described above and in parent U.S. patent application Ser. No. 10/767,191 (Step 2640).

VI. CONCLUSION

Variations of the methods and systems consistent with features of the present invention previously described may be implemented without departing from the scope of the invention. For example, server 130 may be configured with software that automatically performs some or all of the analysis and decisions performed by a user operating client 118. For instance, server 130 may include software stored in memory 136 that, when executed by processing unit 134, analyzes the list of attributes ranked according to their impact on the performance metric values of the test sites (e.g., correlation and/or r-squared values). Server 130 may also execute software that selects the model and associated parameters (e.g., attributes, iterations, etc.) for predicting the performance levels of the test and non-test group sites. Additional, server 130 may execute software that selects one or more of the non-test group sites to implement the tested initiative based on the predicted performance values produced by the executed model. The above processes are not intended to be limiting and other procedures may be performed by software processes executed by server 130 and/or client 118 to supplement and/or compliment those decisions, data input, and analysis performed by a user.

Also, although the initiative analysis process is described as using web server and browser software for exchanging information with client 118 and server 120, methods and systems consistent with aspects of the invention may use any type of technology to allow a user to send and receive information from server 120. Further, although the above described aspects of the invention include communications between a client 118 and a server 120, methods and systems consistent with aspects of the invention are not limited to client-server network configurations. That is, a user associated with business network 110 may leverage a computing environment that is local (i.e., same computing system) to a system operated by the user.

Moreover, the virtual test processes described herein are not limited to the sequences, steps, and systems shown in FIGS. 18-26. Additional, fewer, and different processes and elements may be implemented to configure and run the virtual test processes to identify noise values for given parameter settings.

Further, methods, systems, and articles of manufacture, consistent with features of the present invention may be implemented using various network models, and is not limited to a particular computer and/or network environment. Furthermore, methods, systems, and articles of manufacture, consistent with features of the present invention are not limited to the implementation of systems and processes compliant any particular type of programming language. Any number of programming languages may be utilized without departing from the scope of the present invention.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described aspects of the invention, but instead is defined by the appended claims in light of their full scope of equivalents.

What is claimed is:

1. A method for determining optimal parameter settings for business initiative testing software used for testing initiatives for business locations included in a business network, comprising:
    identifying, by a computer, a business initiative testing model having a set of parameter settings;
    selecting a first parameter setting set for performing the virtual test, the first parameter setting set including a set of selected parameter setting options each respectively corresponding to one of the parameter settings for the business initiative testing model;
    performing, by a computer, a virtual test on a set of virtual test sites, each virtual test site reflecting a selected business location in the business network, wherein each virtual test is a simulated business initiative test performed on test sites where no actual initiative test has been implemented at those test sites, and wherein the virtual test is performed on the virtual test sites using a variation of each parameter setting;
    determining, by a computer, actual performance data associated with the set of virtual test sites;
    determining, by a computer, actual performance data associated with a set of control group sites reflecting second selected business locations in the business network using the tested parameter settings;
    determining a noise value for the first parameter setting set, the noise value reflecting an inconsistency between performance data associated, with the set of virtual test sites and performance data associated with the set of control group sites reflecting second selected business locations in the business network using the tested parameter settings;
    determining, by a computer, a set of optimal parameter settings for the business initiative testing model based on results from the virtual test whereby the optimal parameter settings best minimize noise from the results; and
    configuring, by a computer, the business initiative testing model using the optimal parameter settings to test a business initiative for application in the business network.

2. The method of claim 1, wherein performing the virtual test includes:
    performing a series of virtual tests for each possible combination of the parameter settings for the business initiative testing model.

3. The method of claim 2, wherein iteratively performing the series of virtual tests includes:
    determining a noise value for the respective parameters settings combination for each iteration of the series of virtual tests for a given parameter settings combination.

4. The method of claim 3, further including:
    for each iteration of the series of virtual tests for a given parameter settings combination,
    storing the determined noise value in a data structure including data reflecting noise values for each iteration of the virtual test performed on the virtual test sites for each of the parameter settings combinations.

5. The method of claim 3, further including:
    for each given parameter settings combination,
    determining an average noise value for the given parameter settings combination based on stored noise values for each iteration of the virtual test for the given parameter settings combination.

6. The method of claim 2, wherein performing the series of virtual tests for each possible combination of the parameter settings includes:
    for each iteration of the series of virtual tests,
    randomly selecting the set of virtual test sites, and
    randomly selecting a test start date for collecting historical data associated with each of the randomly selected virtual test sites.

7. The method of claim 1, further including:
    iteratively performing the virtual test on the set of virtual test sites using the first parameter setting set until an iteration threshold is met.

8. The method of claim 1, wherein iteratively performing the virtual test includes:
    storing a noise value for each iteration and first parameter setting in a data structure.

9. The method of claim 1, further including:
    selecting a second parameter setting set when the iteration threshold is met; and
    iteratively performing the virtual test on the set of virtual test sites using the second parameter setting set until the iteration threshold is met.

10. The method of claim 1, wherein iteratively performing the virtual test includes:
    storing a noise value for each iteration and second parameter setting in the data structure.

11. The method of claim 1, wherein determining optimal parameter settings for the first test type includes:
    analyzing the noise values associated with the first and second parameter settings sets; and
    selecting either the first or second parameter settings set as the optimal parameter settings based on whether the first or second parameter settings sets have a lower average noise value over the iterations of the virtual test.

12. The method according to claim 1, further comprising defining a test type associated with the business initiative testing model, wherein the test type is defined based on an attribute of the business initiative test.

13. The method of claim 12, wherein determining the set of optimal parameter settings includes:
    identifying the parameter settings combination having the lowest average noise value as the optimal parameter settings for the first test type of the business initiative testing model.

14. The method of claim 12, wherein configuring the business initiative testing model further includes:
    receiving a request identifying the first test type to test the business initiative to apply to the business network.

15. The method of claim 12, wherein defining the first test type includes:
    defining a test period and a test pre-period, each reflecting a period of time that historical data was collected for the business locations included in the business network.

16. The method of claim 12, further including:
    defining a second test type of the business initiative model;
    performing the virtual test based on the defined second test type to determine second optimal parameter settings for the second test type; and
    performing a business initiative test using the second test type of the business initiative testing model that is automatically configured using the second optimal parameter settings.

17. The method according to claim 1, wherein each parameter setting comprises a set of one or more parameter setting options, wherein a parameter setting option further defines a parameter setting.

18. A system for determining optimal parameter settings for business initiative testing software used for testing initiatives for business locations included in a business network, the system including:
    a computer configured to: identify a business initiative testing model having a set of parameter settings;
    selecting a first parameter setting set for performing the virtual test, the first parameter setting set including a set of selected parameter setting options each respectively corresponding to one of the parameter settings for the business initiative testing model;
    execute a virtual test on a set of virtual test sites, each virtual test site reflecting a selected business location in the business network, wherein each virtual test is a simulated business initiative test for-test sites where no actual initiative test has been implemented at those test sites, and wherein the virtual test is performed on the virtual test sites using a variation of each parameter setting;
    determine actual performance data associated with the set of virtual test sites;
    determine actual performance data associated with a set of control group sites reflecting second selected business locations in the business network using the tested parameter settings;
    determining a noise value for the first parameter setting set, the noise value reflecting an inconsistency between performance data associated, with the set of virtual test sites and performance data associated with the set of control group sites reflecting second selected business locations in the business network using the tested parameter settings;
    determine a set of optimal parameter settings for the business initiative testing model based on results from the virtual test whereby the optimal parameter settings best minimize noise from the results; and
    configure the business initiative testing model using the optimal parameter settings to a test on a business initiative to apply to the business network.

19. The system of claim 18, wherein the computer is further configured to:
    perform a series of virtual tests for each possible combination of the parameter settings for the business initiative testing model.

20. The system of claim 19, wherein the computer is further configured to perform the series of virtual tests by:
    determining a noise value for the respective parameters settings combination for each iteration of the series of virtual tests for a given parameter settings combination.

21. The system of claim 20, wherein the computer is further configured to:
    for each iteration of the series of virtual tests for a given parameter settings combination,
    store the determined noise value in a data structure including data reflecting noise values for each iteration of the virtual test performed on the virtual test sites for each of the parameter settings combinations.

22. The system of claim 20, wherein the computer is further configured to:
    for each given parameter settings combination,
    determine an average noise value for the given parameter settings combination based on stored noise values for each iteration of the virtual test for the given parameter settings combination.

23. The system of claim 22, wherein the computer is further configured to determine the set of optimal parameter settings by identifying the parameter settings combination having the lowest average noise value as the optimal parameter settings of the business initiative testing model.

24. The system of claim 19, wherein the computer is further configured to perform the series of virtual tests for each possible combination of the parameter settings by:
    for each iteration of the series of virtual tests, randomly selecting the set of virtual test sites, and
    randomly selecting a test start date for collecting historical' data associated with each of the randomly selected virtual test sites.

25. The system of claim 24, wherein the computer is further configured to:
defining a test period and a test pre-period, each reflecting a period of time that historical data was collected for the business locations included in the business network.

26. The system of claim 18, wherein the computer is further configured to:
receive a request identifying the first test type to test the business initiative to apply to the business network, and
define the first test type of the business initiative testing model based on the request.

27. The system of claim 18, wherein the computer is further configured to:
iteratively perform the virtual test on the set of virtual test sites using the first parameter setting set until an iteration threshold is met.

28. The system of claim 18, wherein the computer is further configured to iteratively perform the virtual test by storing a noise value for each iteration and first parameter setting in a data structure.

29. The system of claim 18, wherein the computer is further configured to:
select a second parameter setting set when the iteration threshold is met; and
iteratively perform the virtual test on the set of virtual test sites using the second parameter setting set until the iteration threshold is met.

30. The system of claim 18, wherein the computer is further configured to iteratively perform the virtual test by storing a noise value for each iteration and second parameter setting in the data structure.

31. The system of claim 18, wherein the computer is further configured to determine optimal parameter settings by:
analyzing the noise values associated with the first and second parameter settings sets; and
selecting either the first or second parameter settings set as the optimal parameter settings based on whether the first or second parameter settings sets have a lower average noise value over the iterations of the virtual test.

32. The system according to claim 18, wherein a test type is associated with the business initiative testing model and is defined based on an attribute of the business initiative test.

33. The system of claim 32, wherein the computer is further configured to:
define a second test type of the business initiative model;
perform the virtual test based on the defined second test type to determine second optimal parameter settings for the second test type; and
perform a business initiative test using the second test type of the business initiative testing model that is configured using the second optimal parameter settings.

34. A non-transitory computer-readable medium including instructions for, when executed by a processor, performing a method for determining optimal parameter settings for business initiative testing software used for testing initiatives for business locations included in a business network, the method comprising:
identifying, by a computer, a business initiative testing model having a set of parameter settings;
selecting a first parameter setting set for performing the virtual test, the first parameter setting set including a set of selected parameter setting options each respectively corresponding to one of the parameter settings for the business initiative testing model;
performing, by a computer, a virtual test on a set of virtual test sites, each virtual test site reflecting a selected business location in the business network, wherein each virtual test is a simulated business initiative test using a variation of each parameter setting and is performed on test sites where no actual initiative test is performed on the virtual test sites;
determining, by a computer, actual performance data associated with the set of virtual test sites;
determining, by a computer, actual performance data associated with a set of control group sites reflecting second selected business locations in the business network using the tested parameter settings;
determining a noise value for the first parameter setting set, the noise value reflecting an inconsistency between performance data associated, with the set of virtual test sites and performance data associated with the set of control group sites reflecting second selected business locations in the business network using the tested parameter settings;
determining, by a computer, a set of optimal parameter settings for the business initiative testing model based on results from the virtual test whereby the optimal parameter settings best minimize noise from the results; and
configuring, by a computer, the business initiative testing model using the optimal parameter settings to test a business initiative to apply to the business network.

35. A method for testing business initiatives comprising:
receiving, by a computer, a request to test a business initiative to be applied to a set of business locations in a business network;
determining, by a computer, actual performance data associated with a set of virtual test sites;
determining, by a computer, actual performance data associated with a set of control group sites reflecting second selected business locations in the business network using the tested parameter settings;
configuring, by a computer, a business initiative testing model based on the request and a default set of parameter settings for the model, each default parameter setting having a set of parameter setting options and the default set of parameter settings reflecting optimal parameter settings for the model that are determined by identifying a combination of parameter setting options that produce the least amount of noise during iterations of a set of virtual business initiative tests performed for selected virtual test sites, wherein each virtual test is a simulated business initiative test performed on test sites where no actual initiative test has been implemented at those test sites and wherein noise is a measurement of inconsistency between performance data associated with the set of virtual test sites and performance data associated with the set of control group sites reflecting second selected business locations in the business network using the tested parameter settings; and
testing, by a computer, the business initiative using the configured business initiative testing model to produce results reflecting a predicted performance of the business initiative if applied to the set of business locations.

* * * * *